United States Patent
Sankir et al.

(10) Patent No.: US 10,272,405 B2
(45) Date of Patent: Apr. 30, 2019

(54) CARTRIDGE STRUCTURE DESIGNED FOR GENERATION OF HYDROGEN GAS

(71) Applicant: ULUSAL BOR ARASTIRMA ENSTITUSU, Ankara (TR)

(72) Inventors: Mehmet Sankir, Ankara (TR); Nurdan Demirci Sankir, Ankara (TR); Levent Semiz, Ankara (TR); Emre Kaan Can, Ankara (TR); Ramis Berkay Serin, Ankara (TR)

(73) Assignee: ULUSAL BOR ARASTIRMA ENSTITUSU, Ankara (TR)

( * ) Notice: Subject to any disclaimer, the term of this patent is extended or adjusted under 35 U.S.C. 154(b) by 106 days.

(21) Appl. No.: 15/523,388

(22) PCT Filed: Nov. 26, 2015

(86) PCT No.: PCT/IB2015/059137
§ 371 (c)(1),
(2) Date: Apr. 30, 2017

(87) PCT Pub. No.: WO2016/084025
PCT Pub. Date: Jun. 2, 2016

(65) Prior Publication Data
US 2017/0232413 A1    Aug. 17, 2017

(30) Foreign Application Priority Data
Nov. 28, 2014 (TR) ............... a 2014 14378

(51) Int. Cl.
*B01J 7/02* (2006.01)
*B01J 19/20* (2006.01)
(Continued)

(52) U.S. Cl.
CPC ............... *B01J 7/02* (2013.01); *B01F 7/006* (2013.01); *B01F 7/00291* (2013.01);
(Continued)

(58) Field of Classification Search
CPC .......... C01B 3/065; Y02E 60/362; B01J 7/02; H01M 8/04208; H01M 8/04216; H01M 8/065
See application file for complete search history.

(56) References Cited

U.S. PATENT DOCUMENTS 4,155,712 A    5/1979 Taschek
5,779,995 A *  7/1998 Witt .............. B01J 8/1836
                                         422/215
(Continued)

FOREIGN PATENT DOCUMENTS

EP    1367025 A1    12/2003
JP    S58145601      8/1983
(Continued)

*Primary Examiner* — Imran Akram
(74) *Attorney, Agent, or Firm* — Gokalp Bayramoglu

(57) ABSTRACT

This invention relates to a cartridge structure (100, 200, 300) designed for generation of hydrogen gas by means of generating hydrogen using hydride solutions (sodium hydride, lithium borohydride, potassium borohydride, ammonium borane, etc.) in presence of a catalyzer. The objective of this invention is to provide a cartridge structure (100, 200, 300) designed for generation of hydrogen gas by means of generating hydrogen using continuously fed hydride solutions in presence of a catalyzer.

19 Claims, 14 Drawing Sheets

(51) Int. Cl.
  *H01M 8/04082* (2016.01)
  *B01F 7/00* (2006.01)
  *B01F 15/02* (2006.01)
  *B01J 19/00* (2006.01)
  *C01B 3/04* (2006.01)
  *C01B 3/06* (2006.01)
  *F16K 3/06* (2006.01)
  *F16K 3/10* (2006.01)

(52) U.S. Cl.
  CPC ........ *B01F 7/00633* (2013.01); *B01F 15/024* (2013.01); *B01F 15/026* (2013.01); *B01J 19/0006* (2013.01); *B01J 19/20* (2013.01); *C01B 3/04* (2013.01); *C01B 3/065* (2013.01); *F16K 3/06* (2013.01); *F16K 3/10* (2013.01); *H01M 8/04208* (2013.01); *H01M 8/04216* (2013.01); *B01F 2215/0036* (2013.01); *B01J 2219/00164* (2013.01); *B01J 2219/00186* (2013.01); *Y02E 60/362* (2013.01)

(56) References Cited

U.S. PATENT DOCUMENTS

| | | | |
|---|---|---|---|
| 6,409,976 B1 | 6/2002 | Poschmann et al. | |
| 7,858,068 B2 | 12/2010 | Fuller et al. | |
| 7,947,096 B2 | 5/2011 | Tonca | |
| 2001/0045364 A1* | 11/2001 | Hockaday | B01D 19/0031 205/338 |
| 2002/0081254 A1* | 6/2002 | Boger | B01J 19/1875 422/222 |
| 2003/0157003 A1 | 8/2003 | Machado et al. | |
| 2004/0120889 A1* | 6/2004 | Shah | B01D 63/02 423/657 |
| 2004/0258966 A1 | 12/2004 | Mann et al. | |
| 2005/0058595 A1 | 3/2005 | Shi et al. | |
| 2006/0021279 A1 | 2/2006 | Mohring | |
| 2006/0112635 A1* | 6/2006 | Yang | B01J 7/02 48/61 |
| 2006/0165568 A1 | 7/2006 | Yoshizaki | |
| 2006/0269470 A1 | 11/2006 | Zhang et al. | |
| 2011/0174271 A1* | 7/2011 | Wood | F02B 63/04 123/46 E |
| 2012/0067211 A1 | 3/2012 | Tessier et al. | |
| 2012/0156111 A1* | 6/2012 | Ramos | B01J 8/008 422/311 |

FOREIGN PATENT DOCUMENTS

| | | |
|---|---|---|
| JP | 20000201 A | 2/2000 |
| WO | WO2005049485 A1 | 6/2005 |

\* cited by examiner

CARTRIDGE STRUCTURE DESIGNED FOR GENERATION OF HYDROGEN GAS

CROSS REFERENCE TO RELATED APPLICATIONS

This application is the national phase of International Application No. PCT/IB2015/059137, filed on Nov. 26, 2015, which is based upon and claims priority to Turkish Patent Application No. 2014/14378, filed on Nov. 28, 2014, the entire contents of which are incorporated herein by reference.

TECHNICAL FIELD

This invention relates to a cartridge structure designed for generation of hydrogen gas by means of generating hydrogen using hydride solutions (sodium hydride, lithium borohydride, potassium borohydride, ammonium borane, etc.) in presence of a catalyser.

BACKGROUND OF THE INVENTION

Current state of the art includes many systems designed for generation of hydrogen. Systems developed for this purpose have many adverse effects, including use of chemicals that can cause significant risks for human health and environment, large power requirements, the inability to utilise the materials as efficiently as desired, the inability to utilise the catalysers in an efficient way, the large volumes of space required for these systems, and the fact that solid wastes in the system block the product output ports. It is known that materials like hollow fibre with selective permeability properties are also used in these systems. However, the systems in the current state of art frequently face problems like accumulations in the system due to failure to properly secure the hollow fibres, the hollow fibres not being able to maintain their integrity, the inability to clean hollow fibre surfaces, and the unsecured hollow fibres blocking flow paths and preventing flow and thus decreasing efficiency.

The literature includes patents for systems wherein hydrogen gas is generated by various methods, including generation of hydrogen gas from chemical hydrides. These systems require extra energy for driving the cylinders and production of these cylinders is a costly process. It is generally unlikely to be able to reuse the system components, and both input materials and final products come with storage problems.

The United States of America patent document numbered U.S. Pat. No. 7,858,068, an application in the state of the art, discloses a chemical reaction consisting of a process of small tablets comprised of catalyser or solid acid on the outside and chemical hydrides on the inside being placed in a tank filled with water. The acid dissolving in the water acts as a catalyser, reacting with the chemical hydrides dissolving in the water, and the hydrogen gas generated in result of this reaction is collected. However, use of strong acids in such applications constitute a serious hazard for human health and environment in case of a potential leak or rupture. In this system, initiation of the reaction is completely left to happen on its own. However, since it is not possible to implement a continuous operation in this system, it causes loss of time and fails to provide an efficient solution.

The United States of America patent document numbered U.S. Pat. No. 4,155,712, an application in the state of the art, discloses a system for gathering hydrogen gas generated by means of evaporating the water in a tank, forcing this vapour through a hydrofobic membrane only allowing passage of water vapour, causing the water vapour to enter chemical reaction with chemical hydrides it is passing over, thus generating hydrogen gas. Since no catalyser is used in this system the reaction takes place very slowly and only a small amount of hydrogen gas is generated. The fact that the system can only meet simple and small energy needs while requiring a very large volume of space demonstrates that it will have a very low efficiency.

The United States of America patent document numbered US20050058595, an application in the state of the art, discloses a process involving passing a chemical hydride solution through a tank filled with hollow fibre structures and generates hydrogen on the outer surface of hollow fibres which are coated with the catalyser. The generated hydrogen passes through the channels with small pores to the side surfaces of the tank which only allow passage of hydrogen gas, and fills it into a second tank. Here, the solid waste created when the reaction of solution passing through the densely packed hollow fibres will accumulate and obstruct the flow in the system. In case of long term use the hollow fibres will not be able to maintain their structure and location due to gravity effects and become inoperable due to eventual distortions and ruptures.

The United States of America patent document numbered U.S. Pat. No. 6,409,976, an application in the state of the art, discloses a system using a porous structure coated with catalyser on the inside. The prepared solution is passed through the hollow fibres placed inside this structure. The hydrogen gas generated by the reaction taking place inside this structure passes through channel to leave the system and it is stored in a separate place. Accumulation of solid wastes generated by the reaction on the porous structure both covers the catalyser coated surfaces and blocks flow paths, necessitating continuous maintenance and cleaning, which is a costly process.

The United States of America patent document numbered US20060269470, an application in the state of the art, discloses a method for generating hydrogen gas by means of a reaction between a sodium borohydride compound sent into a reaction tank in solid form, and an acid solution pumped into the same reaction tank. The hydrogen gas generated in result of the reaction is sent to a fuel cell by means of a hydrogen separator apparatus. The generated hydrogen gas and the oxygen in the air react inside the fuel cell to generate water, which is optionally sent to the acid tank or reaction tank for dilution. The said system carries some problems like the inability to control concentration of the utilised acid, the need for additional lead time for initial dilution, the difficulty of reusing and storing the acid, and the fact that the said acid is hazardous for human health and environment.

The United States of America patent document numbered US20040258966, an application in the state of the art, discloses three different designs for generating hydrogen gas by using a sodium borohydride solution. The first design involves a reaction which generates hydrogen gas by passing polymer films, carrying sodium borohydride solution in the cells on them, through two cylinders coated with the catalyser. In another embodiment polymer film surface is coated with the catalyser and the micro-globe structures containing sodium borohydride are found on the film. When the polymer film passes through the cylinders the micro-globe structures are crushed, contact the catalyser surface and enter reaction to generate hydrogen gas. In another embodiment sodium borohydride compound is found on the polymer film in solid form, and the polymer film is passed through hollow fibres coated with catalyser on the outside.

Coating of the surface of hollow structure can obstruct passage of water due to the risk of losing porosity, and in result the reaction between water and sodium borohydride particles may not take place.

The United States of America patent document numbered US2012067211, an application in the state of the art, discloses a porous hollow fibre structure treated with a hydrogen permeable palladium or palladium alloy layer. The said hollow fibre has an inner diameter of 30 to 1500 microns and an outer diameter of 100 to 2000 microns. These structural properties create a large surface area and allow efficient separation of hydrogen. Processing and material costs are high, since the building material for hollow fibres is stainless steel. In addition, it also has disadvantages in regard of weight and volume. Hydrogen is generated by burning $CH_4$ and CO, and $CO_2$ is generated as a waste product. Therefore, this also isn't an environmentally-friendly solution.

The Japan patent document numbered JP2000044201, an application in the state of the art, discloses a hydrogen generation tank wherein hydrogen productivity is increased. Inside the said tank catalyser is brought into contact with the hydride containing liquid mixture by means of a rotary propeller. The structure of the said propeller is designed to ensure efficient reaction between the catalyser and the mixture. It is stated that the propeller plates may have foils and holes on them. The catalyser is added into the mixture and there is possibility for the catalyser to precipitate at the bottom, which would decrease the contact surface between the catalyser and the liquid mixture. In addition to the mixing motor, the system also requires a power consuming light source for the reaction to take place.

The Japan patent document numbered JPS58145601, an application in the state of the art, discloses a low cost metal hydride reactor providing high hydrogen yield. The reactor in question contains a porous cylindrical unit and multiple plates reaching from this unit to reactor walls, increasing the rate of generation of hydrogen from hydrides by increasing the surface area. It is stated the cylindrical structure is made of aluminium which allows passage of hydrogen but prevents passage of metal hydride. Since the cartridge is made of mostly aluminium material, the system has a heavier structure in comparison to those using polymeric materials. In addition, the system in the said application is used to both generate and store the hydrogen gas, wherein the gathered hydrogen gas will slow down reaction speed and cause the efficiency to decrease in time.

The United States of America patent document numbered U.S. Pat. No. 7,947,096, an application in the state of the art, discloses a hydrogen generator wherein the water is separately fed into the reactor. The said process involves one water intake and one hydrogen output channel. Hydrogen gas is generated by metals inside the reactor coming into contact and reacting with the water. It is mentioned that hydrides are stored in a separate tank and transferred from there to the reactor, wherein the reaction is supported by a catalyser and permeability is provided by means of a porous core structure. It is pointed out that metal hydride can also be used in powder form in order to increase the reaction surface. The fact that cartridge structures are depleted in time and have to be replaced creates an ongoing extra cost. Since the cartridge is made of mostly aluminium material, the system has a heavier structure in comparison to those using polymeric materials.

SUMMARY OF THE INVENTION

The objective of this invention is to provide a cartridge structure designed for generation of hydrogen gas by means of generating hydrogen using continuously fed hydride solutions in presence of a catalyser.

Another objective of the invention is to provide a cartridge structure designed for generation of hydrogen gas which contains plates coated with a metallic material with catalytic effect and whose numbers can be increased in the same overall volume.

Another objective of the invention is to provide a cartridge structure designed for generation of hydrogen gas wherein outer surface of the hollow fibres emplaced inside the body and fixed in position by clamps and the channels inside are coated with the catalyser.

Another objective of the invention is to provide a cartridge structure designed for generation of hydrogen gas which has a modular structure to enable the user to easily disassemble and clean the system.

Another objective of the invention is to provide a cartridge structure designed for generation of hydrogen to provide ease of storage by using metal hydrides in solid and powder form.

BRIEF DESCRIPTION OF THE DRAWINGS

The "cartridge structure designed for generation of hydrogen" developed to fulfil the objective of the present invention is illustrated in the accompanying figures, wherein.

Figure 1:
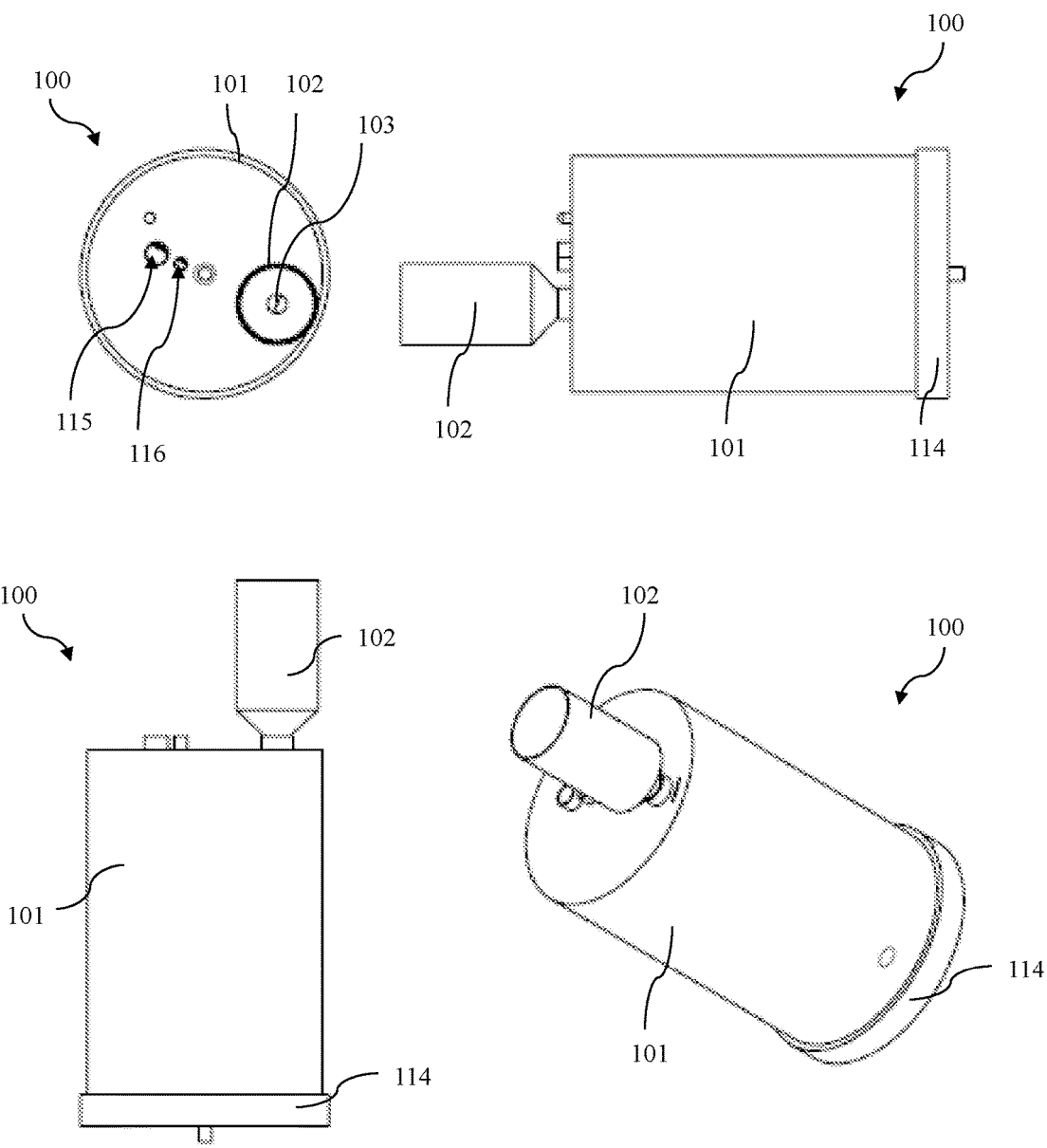
FIG. 1—Overhead, profile and perspective views of the inventive cartridge structure with mixer.
Figure 2:
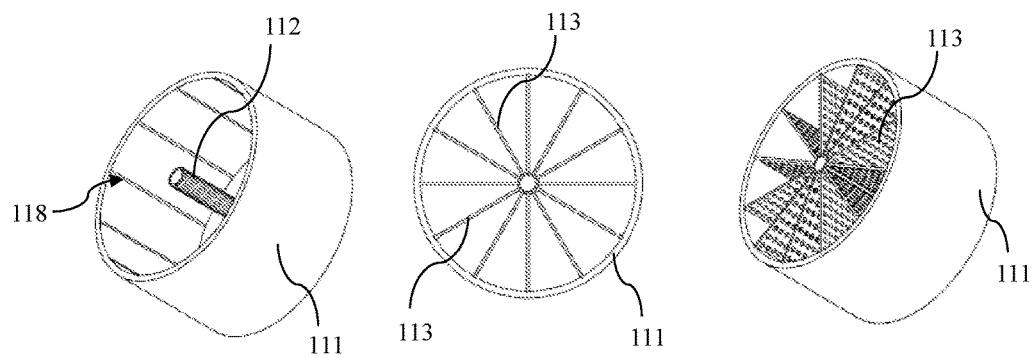
FIG. 2—Perspective views of the plate receptacle in embodiment of the invention shown in FIG. 1, with and without the plates in place.
Figure 3:
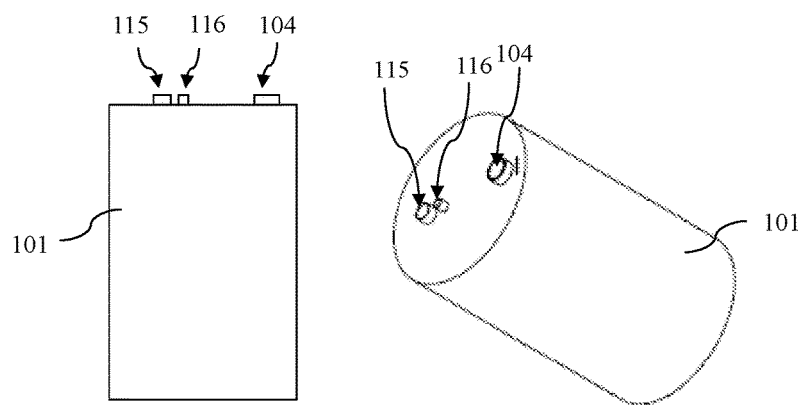
FIG. 3—Profile and perspective view of the inventive embodiment shown in FIG. 1.
Figure 4:
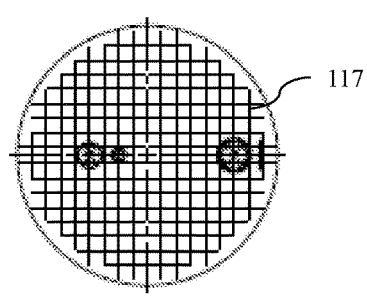
FIG. 4—Perspective view of the filter in the inventive embodiment shown in FIG. 1.
Figure 5:
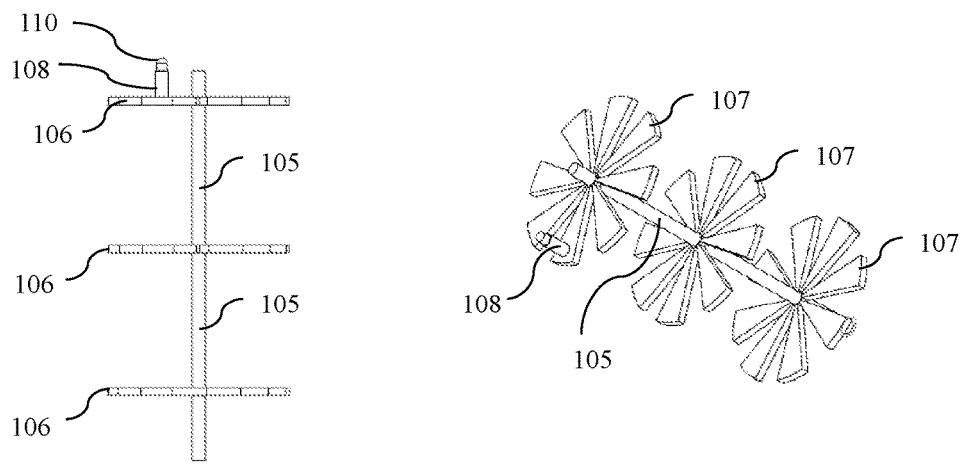
FIG. 5—Profile and perspective view of the propeller system in the inventive embodiment shown in FIG. 1.
Figure 6:
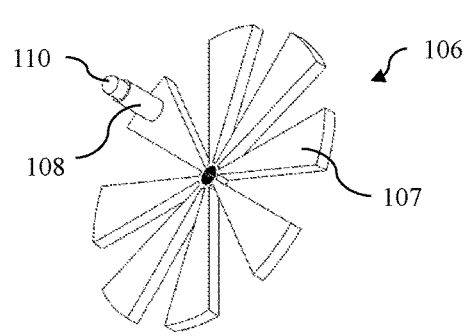
FIG. 6—Perspective view of the topmost propeller in the inventive embodiment shown in FIG. 1.
Figure 7:
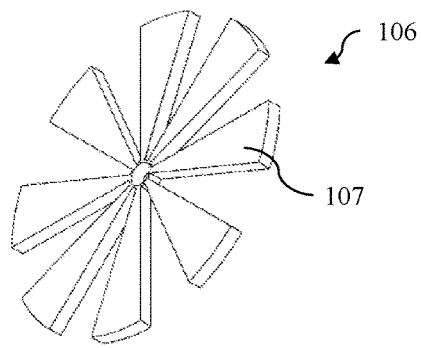
FIG. 7—Perspective view of a middle propeller in the inventive embodiment shown in FIG. 1.
Figure 8:
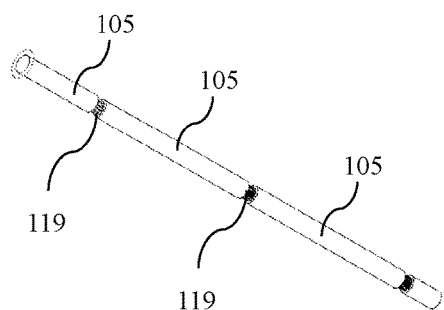
FIG. 8—Perspective view of multiple shafts combined in the inventive embodiment shown in FIG. 1.
Figure 9:
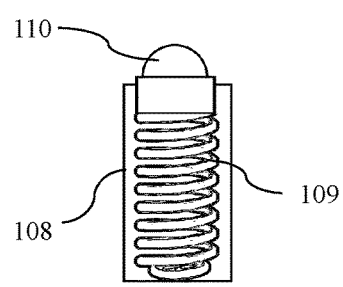
FIG. 9—Cross-section view of the extension in the inventive embodiment shown in FIG. 1.
Figure 10:
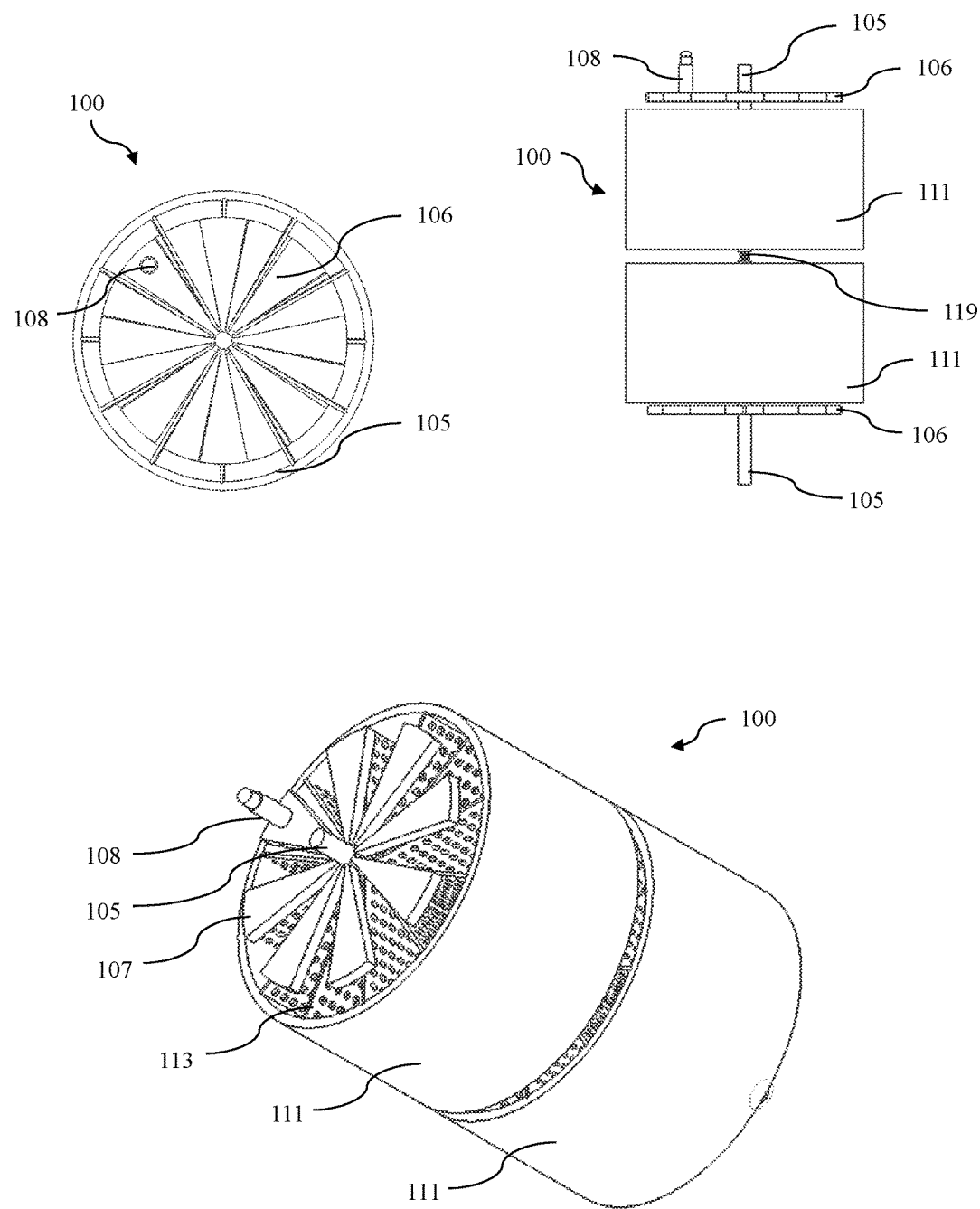
FIG. 10—Overhead, profile and perspective views of the assembled form of multiple plate receptacle in the inventive embodiment shown in FIG. 1.
Figure 11:
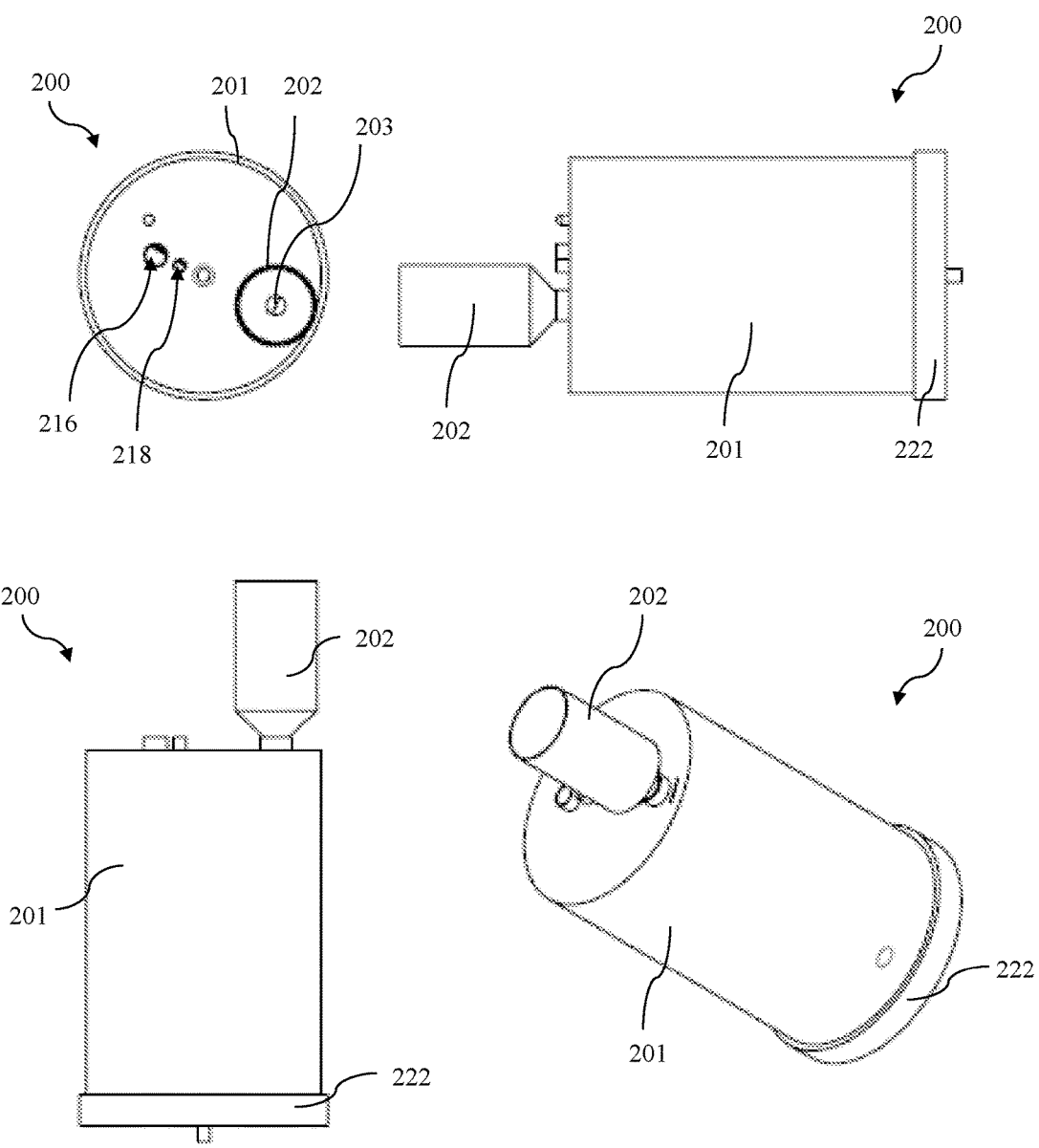
FIG. 11—Overhead, profile and perspective view of the inventive hybrid cartridge structure.
Figure 12:
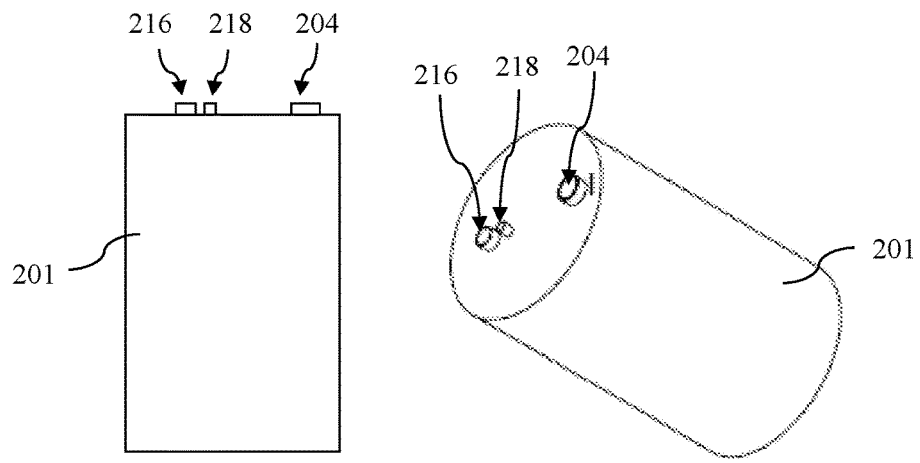
FIG. 12—Profile and perspective views of the outer casing in the inventive embodiment shown in FIG. 11.
Figure 13:
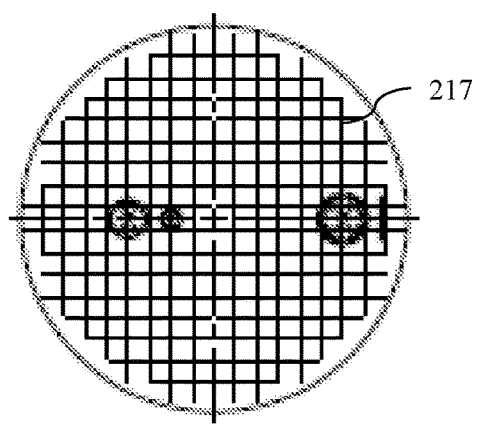
FIG. 13—Perspective view of the filter in the inventive embodiment shown in FIG. 11.
Figure 14:
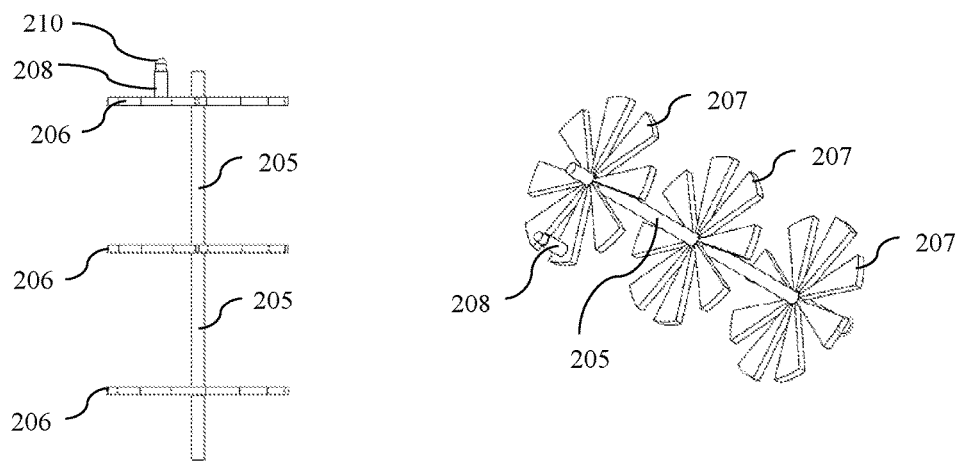
FIG. 14—Profile and perspective views of the propeller system in the inventive embodiment shown in FIG. 11.
Figure 15:
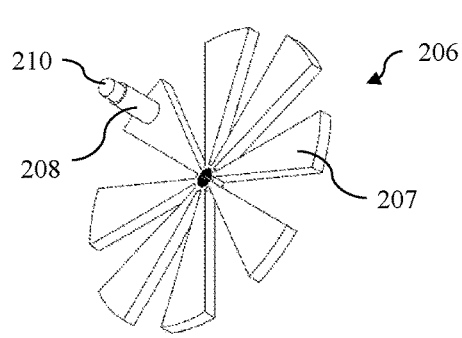
FIG. 15—Perspective view of the topmost propeller in the inventive embodiment shown in FIG. 11.
Figure 16:
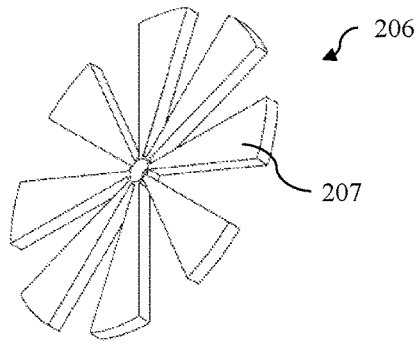
FIG. 16—Perspective view of a middle propeller in the inventive embodiment shown in FIG. 11.
Figure 17:
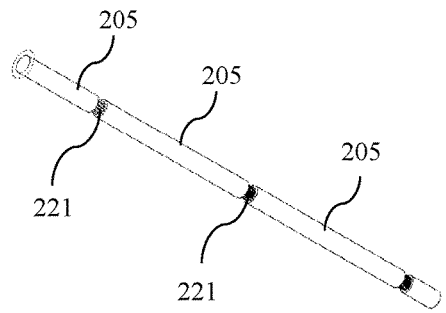
FIG. 17—Perspective view of multiple shafts combined in the inventive embodiment shown in FIG. 11.
Figure 18:
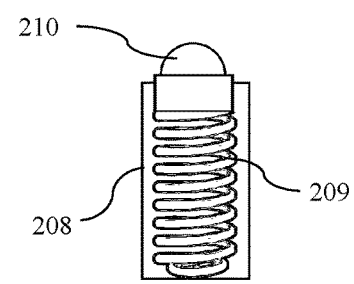
FIG. 18—Cross-section view of the extension in the inventive embodiment shown in FIG. 11.
Figure 19:
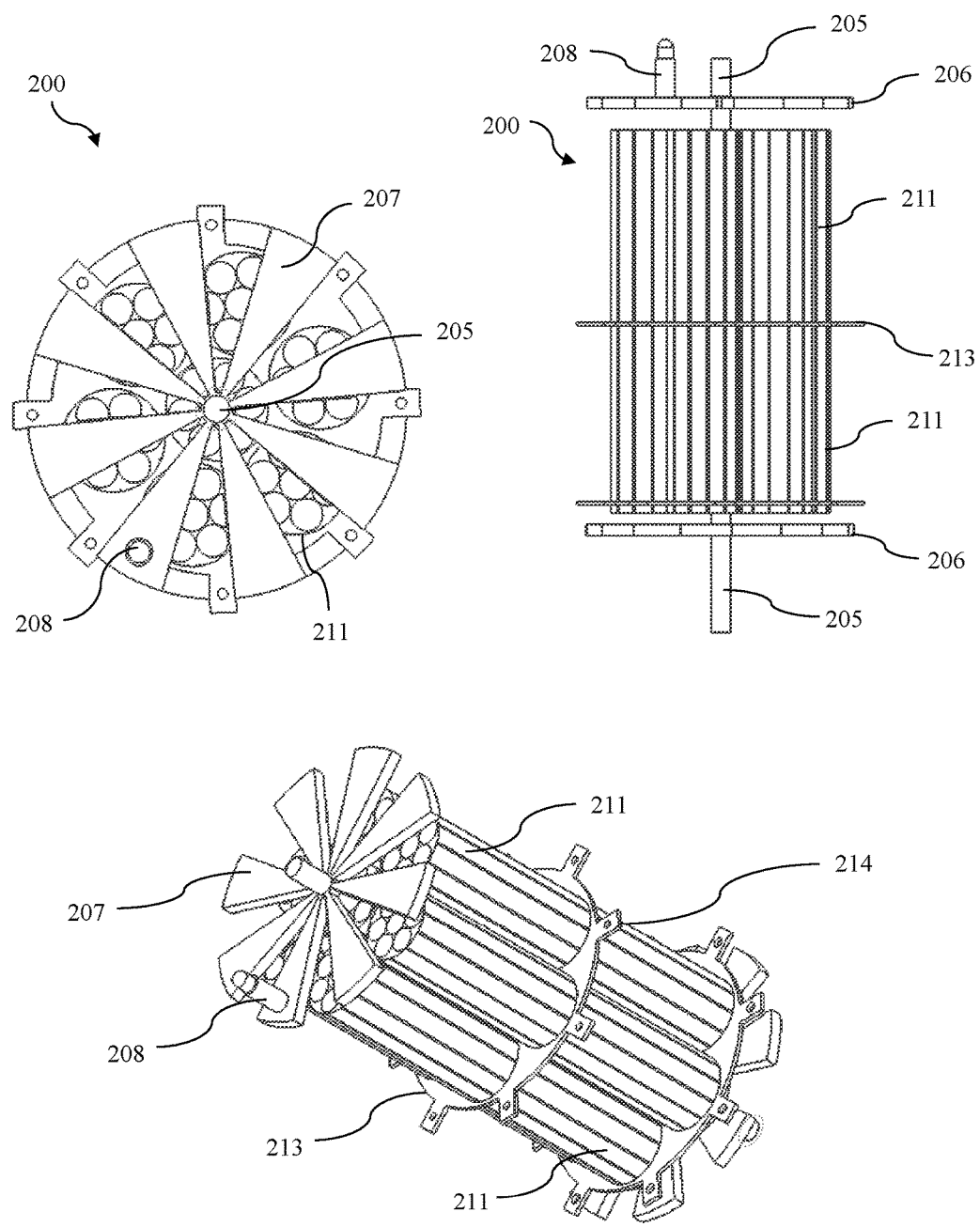
FIG. 19—Overhead, profile and perspective views of the assembled hollow fibres in the inventive embodiment shown in FIG. 11.
Figure 20:
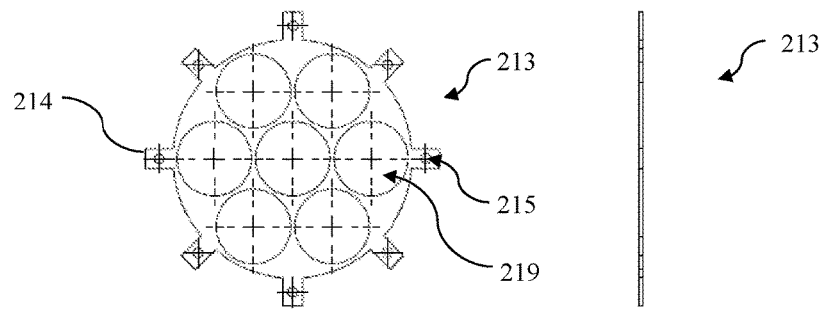
FIG. 20—Overhead and profile view of the clamp in the inventive embodiment shown in FIG. 11.
Figure 21:
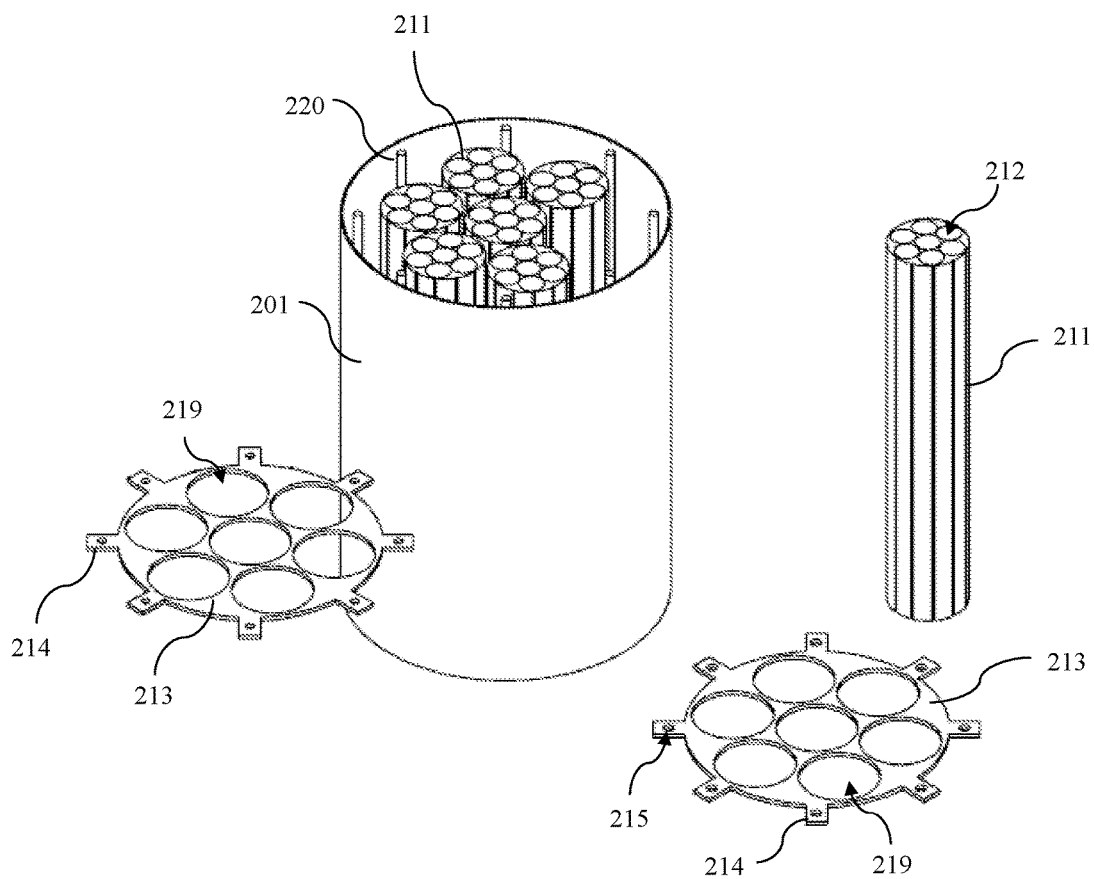
FIG. 21—Perspective exploded view of the hollow fibre emplacement section of the outer casing in the inventive embodiment shown in FIG. 11.
Figure 22:
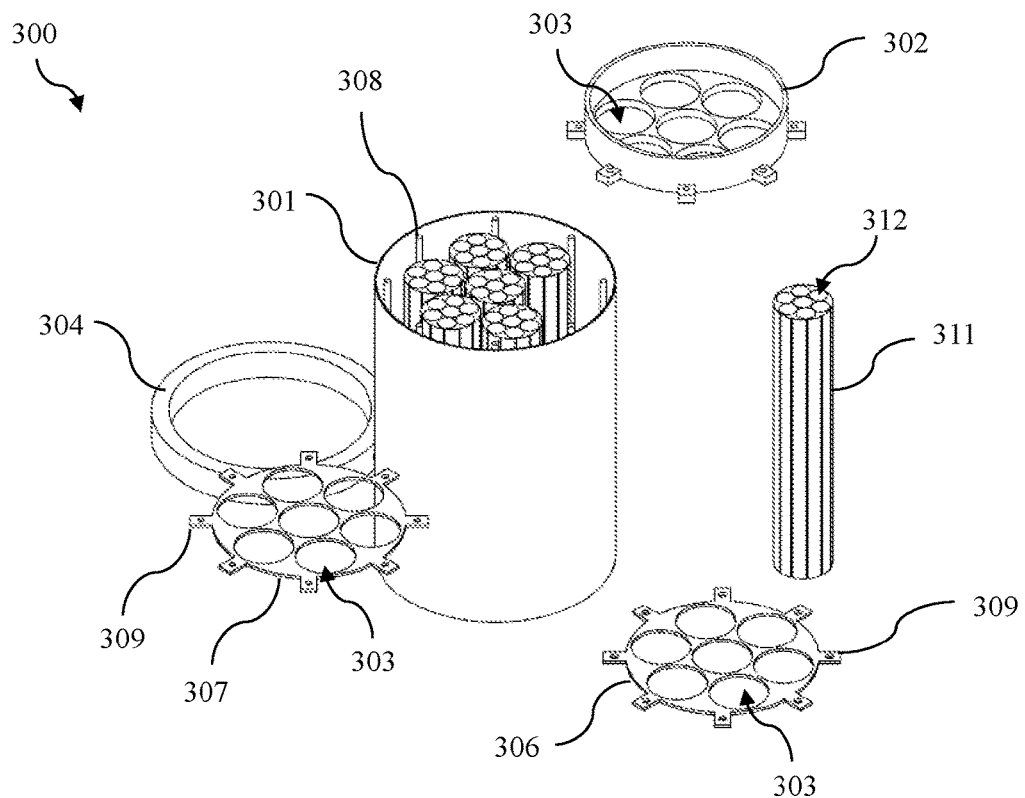
FIG. 22—Perspective exploded view of the inventive cartridge with mixer.
Figure 23:
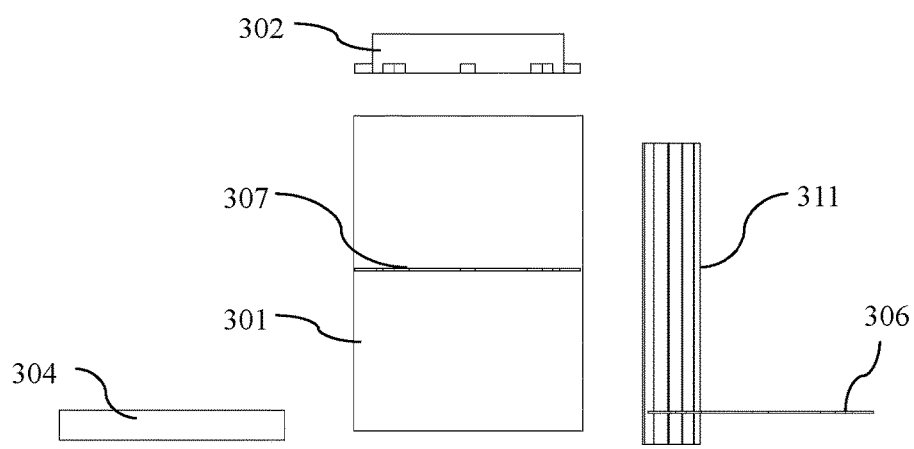
FIG. 23—Profile exploded view of the inventive embodiment shown in FIG. 22.
Figure 24:
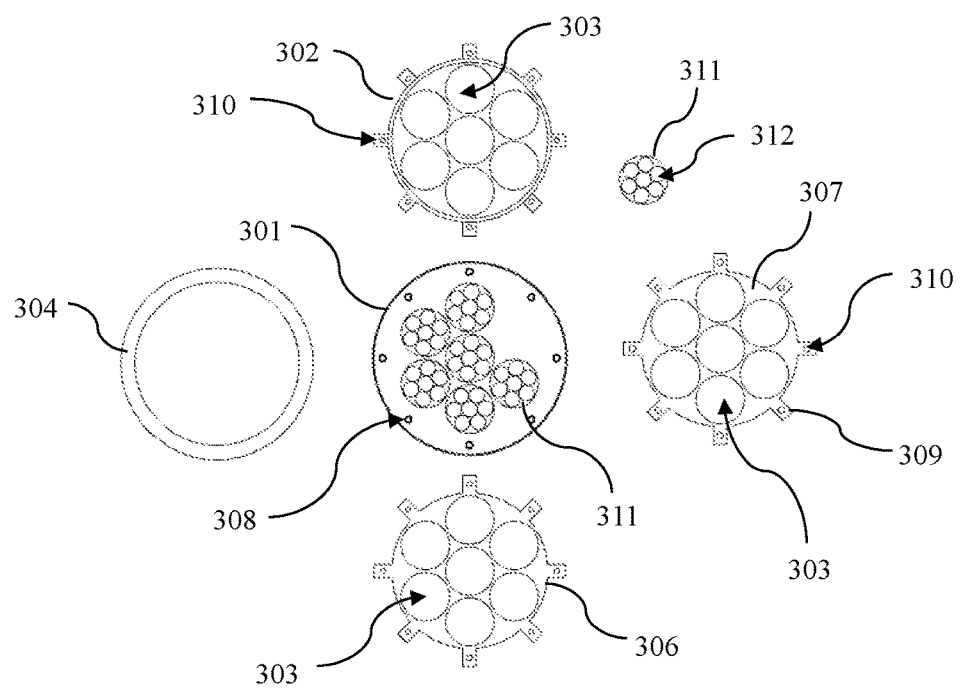
FIG. 24—Overhead view of the inventive embodiment shown in FIG. 22.
Figure 25:
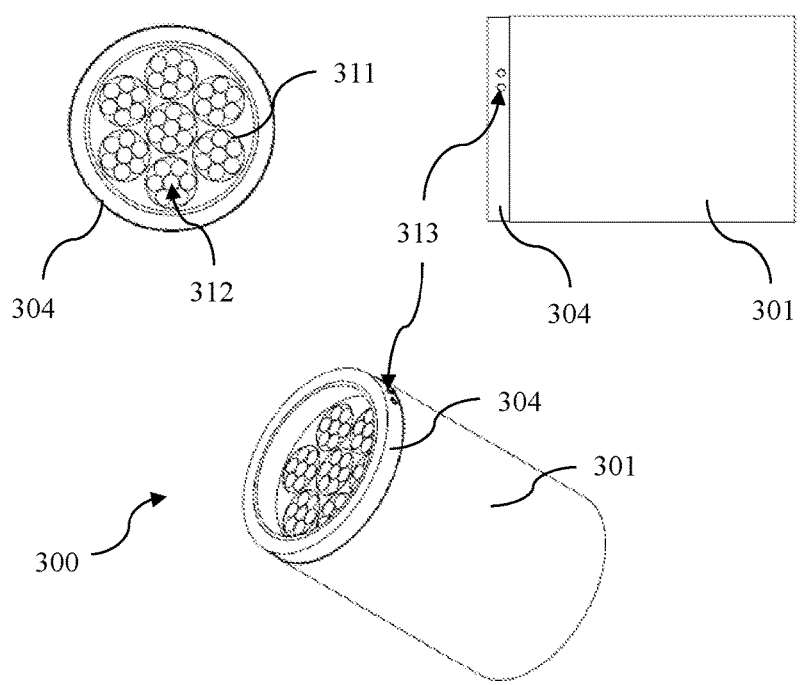
FIG. 25—Overhead, profile and perspective views of the assembled form of the inventive embodiment shown in FIG. 22.
Figure 26:
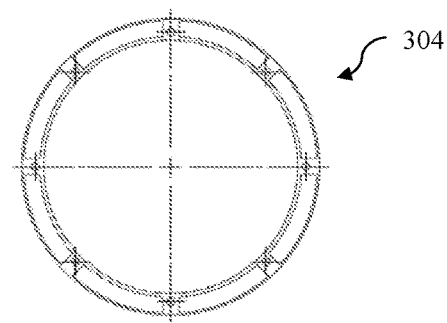
FIG. 26—Overhead view of the top lid in the inventive embodiment shown in FIG. 22.
Figure 27:
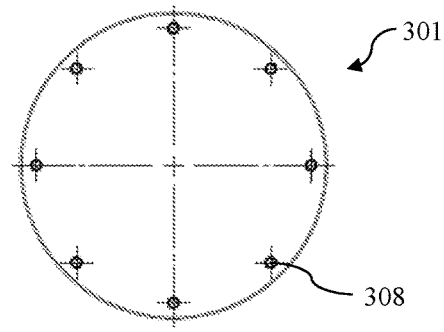
FIG. 27—Overhead view of the body in the inventive embodiment shown in FIG. 22.
Figure 28:
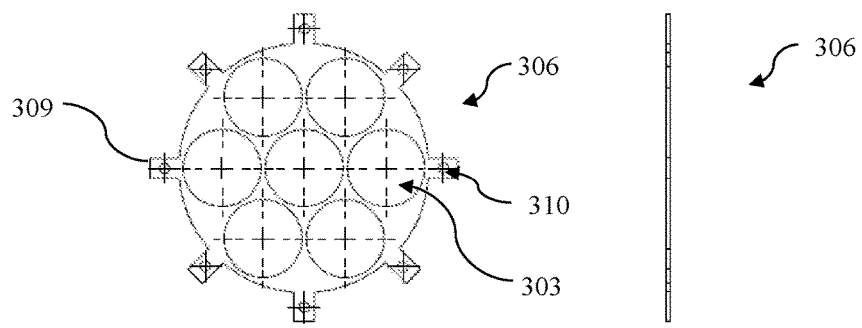
FIG. 28—Overhead and profile views of the bottom clamp in the inventive embodiment shown in FIG. 22.
Figure 29:
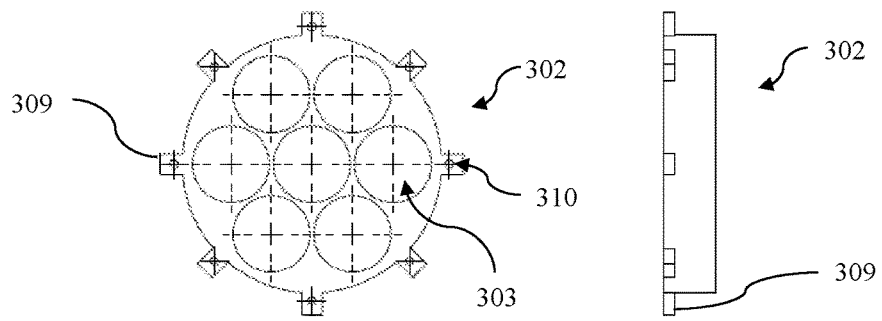
FIG. 29—Overhead and profile views of the top clamp in the inventive embodiment shown in FIG. 22.
Figure 30:
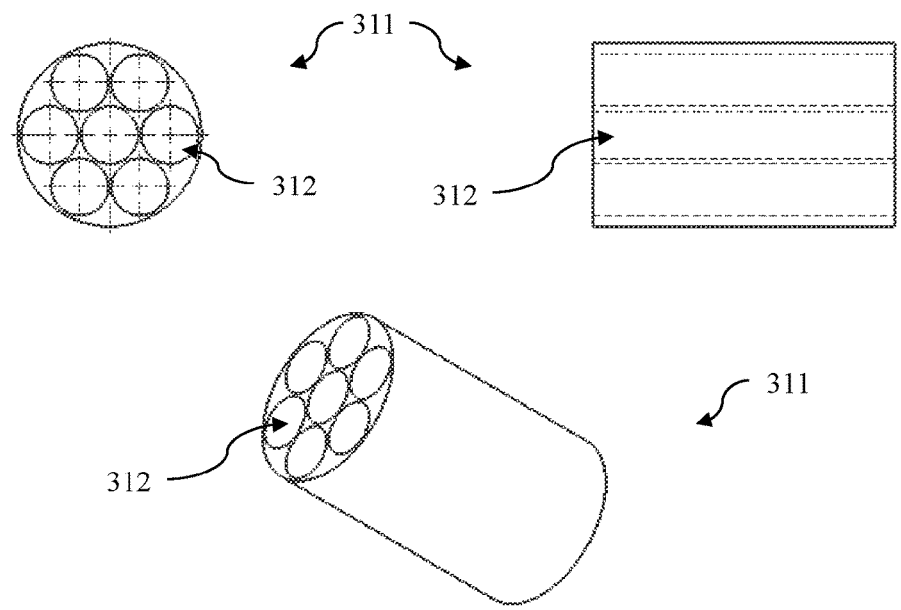
FIG. 30—Overhead, profile and perspective views of the hollow fibre structure in the inventive embodiment shown in FIG. 22.
Figure 31:
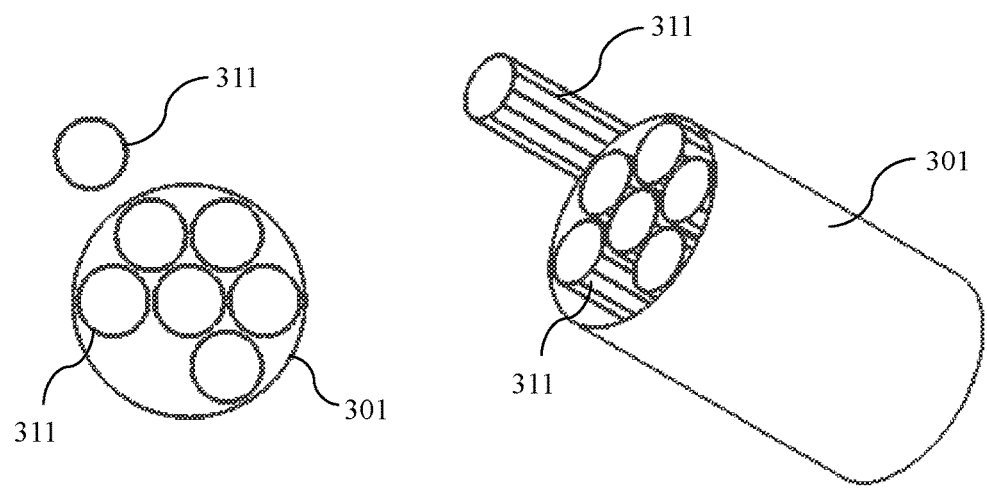
FIG. 31—Overhead and perspective views of emplacement of hollow fibres inside the body in the inventive embodiment shown in FIG. 22.
Figure 32:
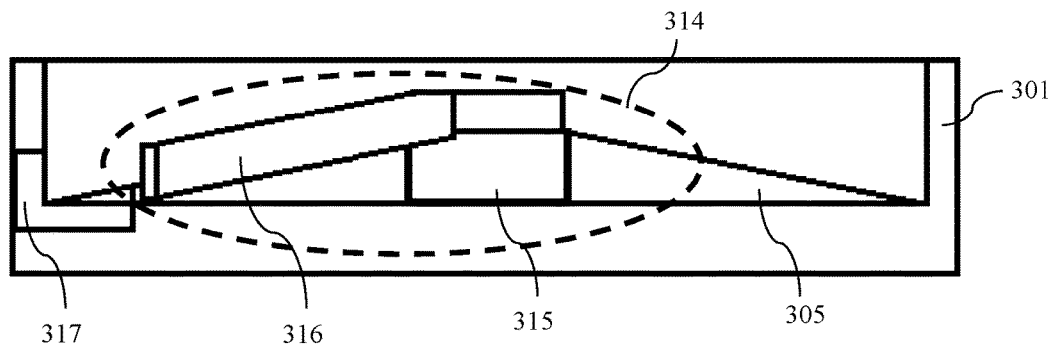
FIG. 32—Profile view of the sweeper in the inventive embodiment shown in FIG. 22.
Figure 33:
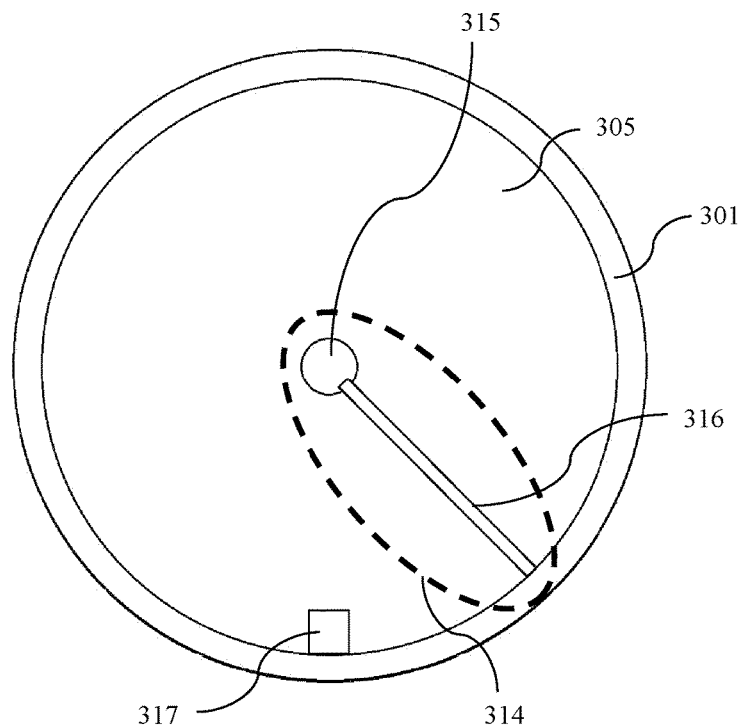
FIG. 33—Overhead view of the sweeper in the inventive embodiment shown in FIG. 22.

The components shown in the figures are each given reference numbers as follows:

100. Cartridge structure with mixer
101. Outer casing
102. Metal hydride tank
103. One way lid
104. Aperture
105. Shaft
106. Propeller
107. Blade
108. Extension
109. Spring
110. Spherical end
111. Plate receptacle
112. Axle
113. Plate
114. Bottom lid
115. Liquid reactant input port
116. H2 collector output
117. Filter
118. Groove
119. Bearing
200. Hybrid cartridge structure
201. Outer casing
202. Metal hydride tank
203. One way lid
204. Aperture
205. Shaft
206. Propeller
207. Blade
208. Extension
209. Spring
210. Spherical end
211. Hollow fibre
212. Channel
213. Clamp
214. Foil
215. Connection opening
216. Liquid reactant input port
217. Filter
218. H2 collector output
219. Aperture
220. Retaining rod
221. Bearing
222. Bottom lid
300. Cartridge structure with hollow fibres
301. Body
302. Top clamp
303. Aperture
304. Top lid
305. Base plate
306. Bottom clamp
307. Middle clamp
308. Retaining rod
309. Foil
310. Connection opening
311. Hollow fibre
312. Channel
313. Output port
314. Sweeper
315. Axle
316. Blade
317. Solid waste output

DETAILED DESCRIPTION OF THE INVENTION

The inventive cartridge structure (100) is based on solution of metal hydrides in a liquid reactant and passage of this solution over a catalytic surface to generate a reaction and obtain hydrogen gas from these metal hydrides, essentially comprised of:

At least one outer casing (101) in the form of a closed container containing the created mixture;

At least one metal hydride tank (102) containing the metal hydride, having a base plate in the form of a reversed truncated cone which aligns with an aperture (104) on the top plate of the outer casing, and having a one way lid (103) on this truncated surface;

At least one shaft (105) passing through the centreline of the outer casing (101) and lying between top and bottom plates, on which the propellers (106) emplaced at varying levels with blades (107) at various orientations are mounted with intervals, rotating on its own axis by means of a motor in order to mix the feed from the top plate of the outer casing (101) on its way through the outer casing (101);

At least one extension (108) placed on at least one blade (107) of the propeller (106) closest to the top plate of the outer casing (101) among all the propellers mounted on the shaft (105), which is positioned to align with the aperture (104) during rotation of the blade, in the form of an empty cylinder reaching towards the top plate of the outer casing (101), containing a spring (109) and at least one spherical end (110) attached to this spring on the surface aligned with the spring (109), pushed towards the top plate of the outer casing (101) by the force applied by the spring (109) and transferring the pushing force applied by the spring (109) onto the bottom of top plate of the outer casing through the spherical end (110), which allows metal hydride from the metal hydride tank (102) entry into the outer casing (101) through the aperture (104) by pushing the one way lid (103) when the spherical end (110) aligns with the aperture (104) during rotation of the propeller (101) on which it is located;

At least one plate receptacle (111) located under the propellers, near the bottom inside the outer casing (101), in the form of an empty cylinder open at top and bottom ends, oriented around an axle (112) aligned with the shaft (105), holding plates (113) whose surfaces are coated with the catalyser which promotes the reaction between the metal hydride and the liquid reactant;

At least one bottom lid (114) located on the bottom plate of the outer casing (101), in the form of a receptacle wherein the waste materials from the reacting mixture consisting of metal hydride and liquid reactant are accumulated; and At least one liquid reactant input port (115) connected with the liquid reactant tank, ensuring feed of liquid reactant into the outer casing (101).

Another embodiment of the invention contains at least one filter (117) located on the bottom lid (114), inside the outer casing (101), capturing the solid waste materials—generated in result of the reaction—between itself and the bottom lid (114) and preventing them from rising again.

The preferred embodiment of the invention contains at least one H₂ collector output (116) located on the top plate of the outer casing (101) for collecting the hydrogen gas generated by the reaction and rising to the top.

In the preferred embodiment of the invention the axle (112) is connected to the shaft (105) through a bearing (119) in order to prevent any disruption in the axis of the shaft (105).

The preferred embodiment of the invention contains multiple shafts (105) supported by bearings (119) on the joining points and having differing numbers of gears at the section where propellers (106) are mounted, in order to have the propellers (106) rotate in differing directions and speeds, thus ensuring an efficient mixture.

Another embodiment of the invention uses multiple shafts (105) passing through the centreline and contacting each other through gears with differing numbers of cogs in order to have the propellers (106) rotate in differing directions and speeds, thus ensuring an efficient mixture.

The preferred embodiment of the invention places the propellers (106) perpendicular to the feed flow.

Another embodiment of the invention orients the propellers (106) at an angle to the feed flow.

Another embodiment of the invention orients the propellers (106) parallel to the feed flow.

The preferred embodiment of the invention contains a metal hydride tank (102) in the form of a cylinder containing the chemical hydride, directing the metal hydride towards the aperture (104) by means of the truncated cone structure of the cylinder near the top plate of the outer casing (101), allowing refeed of metal hydrate through a lid on the top plate of the cylinder which is away from the outer casing (101).

Another embodiment of the invention contains a detachable metal hydride tank (102), which allows the user to remove an expended tank and replace it with a full one to continue operation.

In the preferred embodiment of the invention the metal hydride is in solid state and stored in the metal hydride tank (102) in powder form.

In the preferred embodiment of the invention the outer casing (101) is made from hard polymeric materials like Castermid, Teflon, Plexiglas, Delrin, borosilicate, nylon, polyurethane, polyvinyl chloride (PVC), low density polyethylene (LDPE), linear low density polyethylene (LLDPE), high density polyethylene (HDPE), ethylene vinyl acetate (EVA), natural rubber, synthetic rubber, polystyrene, polymethylmethacrylate (PMMA), polyolefins, polycarbonate, polyoximethylene and the group including combinations of these materials, in order to obtain a strong yet also lightweight structure.

In the preferred embodiment of the invention the plates (113) are made from lightweight polymeric materials like Teflon, Plexiglas, Delrin, borosilicate, nylon, polyurethane, polyvinyl chloride (PVC), low density polyethylene (LDPE), linear low density polyethylene (LLDPE), high density polyethylene (HDPE), ethylene vinyl acetate (EVA), natural rubber, synthetic rubber, polystyrene, polymethylmethacrylate (PMMA), polyolefins, polycarbonate, polyoximethylene and the group including combinations of these materials.

The preferred embodiment of the invention contains a control unit which determines the metal hydride concentration in the mixture inside the outer casing (101) according to the data obtained from a concentration sensor inside the outer casing (101) and regulates metal hydride and liquid reactant feeding rates according to this information.

In the preferred embodiment of the invention the shaft (105) is connected to the motor providing the drive for rotation through the top plate of the outer casing (101) in order to prevent solid wastes from enclosing the shaft and obstructing its movement as time passes, to expend less energy by being close to the extension (108) pushing on the one way lid (103), and to provide ease of assembly/disassembly.

In another embodiment of the invention the axle (112) is attached to the shaft (105), and ensures the plates (113) located on and around the axle (112) and the axle (112) itself rotate on the movement axis of the shaft.

In the preferred embodiment of the invention the plates (113) are mounted around the axle (112) in parallel with the feed flow in order to increase reaction efficiency and to increase the contact surface where the mixture reaction will take place during downward flow of the feeds.

In another embodiment of the invention the plates (113) are mounted around the axle (112) at an angle to the feed flow and at different orientations in order to increase reaction efficiency and to increase the contact surface where the mixture reaction will take place during downward flow of the feed.

In the preferred embodiment of the invention the plates (113) are built with holes in order to decrease potential friction in the flow and to increase the contact surface of the mixture.

In another embodiment of the invention the plates (113) are built with a roughened surface in order to increase reaction efficiency and to increase the contact surface where the mixture reaction will take place.

In the preferred embodiment of the invention the plates (113) are slid into the grooves (118) opened inside the plate receptacle (111) in order to ensure secure placement of the plates (113) into the plate receptacle (111) without damaging their structure.

The preferred embodiment of the invention contains a concentration sensor in order to measure the concentration of the solution which generates hydrogen gas in result of its reaction.

In the preferred embodiment of the invention a control unit controls and regulates flow rate, loopback ratio and concentration of the solution.

The preferred embodiment of the invention contains a filtering unit to prevent any problems arising from the solid wastes generated during generation of hydrogen gas inside the solution.

In the preferred embodiment of the invention the chemical hydrides used as fuel for generation of hydrogen gas include: neutral borane compounds (e.g. deca borane), ammonium boranes (NHxBHy and $NH_xRBH_y$, x=1, 2, 3, 4, y=1, 2, 3, 4, R: methyl, ethyl, propyl, butyl groups), borohydride salts ($M(BH_4)_n$), tri-borohydride salts ($M(B_3H_8)_n$), decahydro borate salts ($M_2(B_{10}H_{10})_n$), tri-decahydro borate salts ($M(B_{10}H_{13})_n$), dodecahydro dodecaborate salts ($M_2(B_{12}H_{12})_n$), octadecahydro icosaborate ($M_2(B_{20}H_{18})_n$) (M: the group containing alkali metals, alkali earth metals, aluminium cations, zinc cations, ammonium cations, n: cation charge); $M^IM^{III}H_{4-n}R_n$, $M^{II}(M^{III}H_{4-n}R_n)_2$, ($M^I$ alkali metal, $M^{II}$ alkali earth metal or zinc, $M^{III}$: an element in boron, aluminium and gallium group, R: the group containing alkoxy, aryloxy, acyloxy groups, n: 0, 1, 2, 3) compounds and the group containing binary and poly combinations of these. The preferred embodiment of the invention uses a chemical hydride selected from among the group including sodium borohydride, lithium borohydride, potassium borohydride, ammonium borane and combinations of these.

The preferred embodiment of the invention uses a solvent suitable for the utilised chemical hydride, selected from among the group including water, protic solvents, alcohols, organic solvents and combinations of these. Citric acid, hydrochloric acid and sulphuric acid are preferred as protic solvents. Methyl alcohol, ethyl alcohol, propyl alcohol and isopropyl alcohol are preferred as alcoholic solvents.

The preferred embodiment of the invention uses a catalyser selected from among the group including the metals from Group I B to VIII B on the periodic table as well as combinations, compounds and alloys of these. A catalyser selected from among the group containing platinum, ruthenium, nickel, cobalt, iron, rhodium and palladium metals and binary and poly alloys of these metals is preferred as the catalyser.

The inventive cartridge structure (100) is based on solution of metal hydrides in a liquid reactant and passage of this solution over a catalytic surface to generate a reaction and obtain hydrogen gas from these metal hydrides. System operation is activated by the rotational movement driven by a motor shaft (105). The rotational drive provided by the shaft (105) rotates the propellers (106) around the axis of the shaft (105). By transferring the rotational drive of the motor to a shaft (105) carrying gears with differing numbers of cogs it becomes possible to operate multiple propellers (106) rotating in differing directions and speeds. The spherical end (110) on the extension (108) located on the topmost propeller (106) moves while applying pressure on the top plate of the outer casing (101). The spring (109) in the extension (108) pushes on the spherical end (110), driving it to put pressure on the bottom surface of the top plate of the outer casing (101). When aligned with the aperture (104) located on the top plate of the outer casing (101) the spherical end (110) is driven by the force applied by the spring (109) to push and open the one way lid (103) aligning with the aperture (104). This allows the metal hydride to enter the outer casing (101) through the aperture (104). The faster the shaft (105) rotates, the more metal hydride enters the system.

Similar to metal hydride, the liquid reactant (preferably water) is fed into the outer casing through the liquid reactant input port (115) on the outer casing (101). Hitting the blades (107) of the propellers (106) the metal hydride and the liquid reactant blend and form a mixture. Use of propellers (106) ensures a homogenous mixture with a consistent concentration. After being blended by the impact of the blades (107) the metal hydride and the liquid reactant continue downwards through the blades (107) and flow towards the plate receptacle (111). Passing over the plates (113) located inside the plate receptacle (111) the mixture enters reaction by catalytic effect of the metal coating on the surface of the plates (113) and hydrogen gas is generated in result of this reaction.

The rotational drive applied by the motor to the shaft (105) also rotates the axle (112) contacting the shaft (105). In this system the plates (113) are emplaced in the plate receptacle (111) in a symmetrical formation. Plate receptacle (111) has the form of a cylinder containing grooves (116) to allow secure placement of the plates (113) inside it. This allows secure placement of the plates (113) without damaging their geometry or disturbing their placement. The number of channels on the plate receptacle (111) can be increased or decreased, thus allowing formation of catalyser surface area as desired. Plates (113) are pieces coated with the catalyser on one or both faces. Plates (113) can be coated by the metallic materials acting as the catalyser, or directly made of such materials. The holes opened on the plates (113) serve both to decrease the friction in the flow and to increase the contact surface between the mixture and the plates (113). The reaction wastes are filtered through the filter (115) placed close to the bottom of the outer casing (101) and accumulated on the bottom lid (114). Thus solid wastes are removed from the system. In addition, a time dependent cleaning apparatus which can be set to operate in specific intervals can also be designed to prevent the accumulated waste from increasing too much, thus ensuring continuous operation of the system.

Example 1

Catalyser coated surface area of 1 plate (2 faces)=2700 $mm^2$ (multi-hole structure)

Catalyser coated surface area of 12 plates inside 1 receptacle=2700*12=32400 $mm^2$ $H_2$ gas flow rate obtained from a catalyser surface area of 4510 $mm^2$=260 ml/min $H_2$ gas flow rate obtained from a plate receptacle=1.83 L/min System volume=45 mm*45 mm*$\pi$*142 mm=0.9 L (45 mm=radius of cylindrical system, 142 mm=height of system)

Assuming;

only the plates are coated with the catalyser;

the inside surface of the system is not coated with the catalyser;

the propellers are not coated with the catalyser; and only the system volume is accounted and volume of the tanks is not accounted:

$H_2$ gas flow rate generated in a system with a volume of 1 L=(1.83 L/min)

1 L/0.9 L=2.03 L/min (where system volume is 1 liter). This figure may increase by a certain ratio according to the rotation speed of the generation shaft (105).

Surface area of one of the utilised plates (113) is 27 $cm^2$.

One plate receptacle (111) contains 12 plates (113). This gives a total surface area of 324 cm². When the plates (113) in the system are coated with:

1. FeCl2 catalyser, the total hydrogen gas amount generated by the system is 64.8 NmL/min. This figure equates to 0.2 NmL/(min×cm2 plate surface area).
2. Pt/C catalyser, the total hydrogen gas amount generated by the system is 648 NmL/min. This figure equates to 2 NmL/(min×cm2 plate surface area).
3. Pt—Ru catalyser, the total hydrogen gas amount generated by the system is 972 NmL/min. This figure equates to 3 NmL/(min×cm2 plate surface area).
4. Porous platinum catalyser, the total hydrogen gas amount generated by the system is 1879 NmL/min. This figure equates to 5.8 NmL/(min×cm2 plate surface area).
5. Porous ruthenium catalyser, the total hydrogen gas amount generated by the system is 1717 NmL/min. This figure equates to 5.3 NmL/(min×cm2 plate surface area).

The fact that the amount of catalyser (the surface area) (which can be adjusted based on the number of plates (113)) and its placement are fixed ensures that the system provides a long service life and a consistent hydrogen generation yield. Power consumption is minimised by means of utilising the natural inclinations of the system inputs and the generated products (liquid elements move downwards, generated $H_2$ moves upwards). Hydrogen generation is connected to (and can be stopped by) the rotation rate of the motor (shaft). There is no other factor outside the surface area of generation and the shaft speed, and these two factors are completely under control of the user. Framework of the inventive cartridge (100) is made of hard materials (e.g. Cartermid, Teflon, etc.). The plates (113) are mostly made of Teflon and/or polymer based lightweight materials (excluding the frame). Structure of the plate receptacle (111) accommodates increased numbers of plates (113). In addition, the modular design allows easy disassembly, maintenance and cleaning.

The inventive cartridge structure (200), is based on solution of metal hydrides in a liquid reactant and passage of this solution over a catalytic surface to generate a reaction and obtain hydrogen gas from these metal hydrides, essentially comprised of:

At least one outer casing (201) in the form of a closed container containing the created mixture;

At least one metal hydride tank (202) containing the metal hydride, having a base plate in the form of a reversed truncated cone which aligns with an aperture (204) on the top plate of the outer casing, and having a one way lid (203) on this truncated surface;

At least one shaft (205) passing through the centreline of the outer casing (201) and lying between top and bottom plates, on which the propellers (206) emplaced at varying levels with blades (207) at various orientations are mounted with intervals, rotating on its own axis by means of a motor in order to mix the feed from the top plate of the outer casing (201) on its way through the outer casing (201);

At least one extension (208) placed on at least one blade (207) of the propeller (206) closest to the top plate of the outer casing (201) among all the propellers mounted on the shaft (205), which is positioned to align with the aperture (204) during rotation of the blade, in the form of an empty cylinder reaching towards the top plate of the outer casing (201), containing a spring (209) and at least one spherical end (210) attached to this spring on the surface aligned with the spring (209), pushed towards the top plate of the outer casing (201) by the force applied by the spring (209) and transferring the pushing force applied by the spring (209) onto the bottom of top plate of the outer casing through the spherical end (210), which allows metal hydride from the metal hydride tank (202) entry into the outer casing (201) through the aperture (204) by pushing the one way lid (203) when the spherical end (210) aligns with the aperture (204) during rotation of the propeller (201) on which it is located;

At least one hollow fibre (211) coated with a catalytic metal promoting the hydrogen generating reaction in the chemical hydride solution composed of the metal hydride and the solvent blended by impact of the propellers (206) and reacting during their passage over the channels (212);

At least one clamp (213) securing the hollow fibres in their determined position, lying lengthwise inside the outer casing (201), passing through the apertures (219) on the outer casing (201);

Retaining rods (220) reaching into the outer casing (201) to retain the clamp (213) on its specified position on the outer casing (201);

Foils (214) with at least one connection opening (215) with dimensions allowing passage of the retaining rods (220), reaching towards the outer casing (201) from the surface of the clamp (213) facing the outer casing (201) and securing a distance between them;

At least one bottom lid (222) located on the bottom plate of the outer casing (201), in the form of a receptacle wherein the waste materials from the reacting mixture consisting of metal hydride and liquid reactant are accumulated; and At least one liquid reactant input port (216) connected with the liquid reactant tank, ensuring feed of liquid reactant into the outer casing.

Another embodiment of the invention contains at least one filter (218) located on the bottom lid (222) inside the outer casing (201), capturing the solid waste materials—generated in result of the reaction—between itself and the bottom lid (222) and preventing them from rising again.

The preferred embodiment of the invention contains at least one $H_2$ collector output (217) located on the top plate of the outer casing (201) for collecting the hydrogen gas generated by the reaction and rising to the top.

In the preferred embodiment of the invention the axle is connected to the shaft (205) through a bearing (221) in order to prevent any disruption in the axis of the shaft (205).

The preferred embodiment of the invention contains multiple shafts (205) supported by bearings (221) on the joining points and having differing numbers of gears at the section where propellers (206) are mounted, in order to have the propellers (206) rotate in differing directions and speeds, thus ensuring an efficient mixture.

Another embodiment of the invention uses multiple shafts (205) passing through the centreline and contacting each other through gears with differing numbers of cogs in order to have the propellers (206) rotate in differing directions and speeds, thus ensuring an efficient mixture.

The preferred embodiment of the invention places the propellers (206) perpendicular to the feed flow.

Another embodiment of the invention orients the propellers (206) at an angle to the feed flow.

Another embodiment of the invention orients the propellers (206) parallel to the feed flow.

The preferred embodiment of the invention contains a metal hydride tank (202) in the form of a cylinder containing the chemical hydride, directing the metal hydride towards the aperture (204) by means of the truncated cone structure of the cylinder near the top plate of the outer casing (201), allowing refeed of metal hydrate through a lid on the top plate of the cylinder which is away from the outer casing (201).

Another embodiment of the invention contains a detachable metal hydride tank (202), which allows the user to remove an expended tank and replace it with a full one to continue operation.

In the preferred embodiment of the invention the metal hydride is in solid state and stored in the metal hydride tank (202) in powder form.

In the preferred embodiment of the invention the outer casing (201) is made from hard polymeric materials like Castermid, Teflon, Plexiglas, Delrin, borosilicate, nylon, polyurethane, polyvinyl chloride (PVC), low density polyethylene (LDPE), linear low density polyethylene (LLDPE), high density polyethylene (HDPE), ethylene vinyl acetate (EVA), natural rubber, synthetic rubber, polystyrene, polymethylmethacrylate (PMMA), polyolefins, polycarbonate, polyoximethylene and the group including combinations of these materials, in order to obtain a strong yet also lightweight structure.

The preferred embodiment of the invention contains a control unit which determines the metal hydride concentration in the mixture inside the outer casing (201) according to the data obtained from a concentration sensor inside the outer casing (201) and regulating metal hydride and liquid reactant feeding rates according to this information.

In the preferred embodiment of the invention the shaft (205) is connected to the motor providing the drive for rotation through the top plate of the outer casing (201) in order to prevent solid wastes from enclosing the shaft and obstructing its movement as time passes, to expend less energy by being close to the extension (208) pushing on the one way lid (203), and to provide ease of assembly/disassembly.

In the preferred embodiment of the invention the hollow fibres (211) are coated with the catalytic metal to provide a larger contact surface for the reaction.

In the preferred embodiment of the invention the clamp (213) is in the form of a hexagon containing 7 apertures (219), one located at the centre of the hexagon and the remaining six located on each corner of the hexagon, through which the hollow fibres (211) pass.

In the preferred embodiment of the invention the retaining rod (220) is in the form of a rod with a gradually widening cross-section reaching through the outer casing (201) to allow emplacement of clamps (213) with gradually larger connection openings (215) to be aligned at determined positions.

In the preferred embodiment of the invention a loopback unit collects the chemical hydride solution after generation of hydrogen gas and removal of the chemical hydride out of the outer casing (201) and pumps it back to the metal hydride tank to establish circulation and increase efficiency.

The preferred embodiment of the invention contains a concentration sensor in order to measure the concentration of the solution which generates hydrogen gas in result of its reaction.

In the preferred embodiment of the invention a control unit controls and regulates flow rate, loopback ratio and concentration of the solution.

The preferred embodiment of the invention contains a filtering unit to prevent any problems arising from the solid wastes generated during generation of hydrogen gas inside the solution.

In the preferred embodiment of the invention the chemical hydrides used as fuel for generation of hydrogen gas include: neutral borane compounds (e.g. deca borane), ammonium boranes (NHxBHy and $NH_xRBH_y$, x=1, 2, 3, 4, y=1, 2, 3, 4, R: methyl, ethyl, propyl, butyl groups), borohydrinde salts ($M(BH_4)_n$), tri-borohydride salts ($M(B_3H_8)_n$), decahydro borate salts ($M_2(B_{10}H_{10})_n$), tri-decahydro borate salts ($M(B_{10}H_{13})_n$), dodecahydro dodecaborate salts ($M_2(B_{12}H_{12})_n$), octadecahydro icosaborate ($M_2(B_{20}H_{18})_n$) (M: the group containing alkali metals, alkali earth metals, aluminium cations, zinc cations, ammonium cations, n: cation charge); $M^I M^{III} H_{4-n} R_n$, $M^{II}(M^{III} H_{4-n} R_n)_2$, ($M^I$ alkali metal, $M^{II}$ alkali earth metal or zinc, $M^{III}$: an element in boron, aluminium and gallium group, R: the group containing alkoxy, aryloxy, acyloxy groups, n: 0, 1, 2, 3) compounds and the group containing binary and poly combinations of these. The preferred embodiment of the invention uses a chemical hydride selected from among the group including sodium borohydride, lithium borohydride, potassium borohydride, ammonium borane and combinations of these.

The preferred embodiment of the invention uses a solvent suitable for the utilised chemical hydride, selected from among the group including water, protic solvents, alcohols, organic solvents and combinations of these. Citric acid, hydrochloric acid and sulphuric acid are preferred as protic solvents. Methyl alcohol, ethyl alcohol, propyl alcohol and isopropyl alcohol are preferred as alcoholic solvents.

In the preferred embodiment of the invention a catalyser is selected from among the group including the metals from Group I B to VIII B on the periodic table as well as combinations, compounds and alloys of these. A catalyser selected from among the group containing platinum, ruthenium, nickel, cobalt, iron, rhodium and palladium metals and binary and poly alloys of these metals is preferred as the catalyser.

The inventive cartridge structure (300) for generation of hydrogen gas provides generation of hydrogen gas from the chemical hydride solution continuously fed into the system from a tank, and it is essentially comprised of:

- At least one outer casing (301) in the form of a closed container with an open top plate and having at least one base plate (305) where the solid wastes and liquid mixture created in result of the reaction accumulates;
- At least one top clamp (302) affixed inside the casing (301) through the open top plate of the casing (301), its ridges reaching out of the outer casing forming a cavity where the solution coming from the tank is suspended for some time before entering the casing (301) and having at least one aperture (303) through which the solution can enter the casing (301);
- At least one top lid (304) with the dimensions filling the gap between the ridges of the top clamp (302) and the casing (301, shaped in the form of a reversed U covering over this gap, thus ensuring a tight seal between the ridges of top clamp (302) and the casing (301);
- At least one bottom clamp (306) positioned inside the casing (301) on the base plate (305) having apertures (303) on the same alignment and with the same cross-section with those on the top clamp (302);
- At least one middle clamp (307) positioned inside the casing (301), between the top clamp (302) and the bottom clamp (306), having apertures (303) on the same alignment and with the same cross-section with those on the top clamp (302) and the bottom clamp (306);

Retaining rods (308) reaching into the casing (301) in order to secure the top clamp (302), the bottom clamp (306) and the middle clamp (307) at their determined positions;

Foils (309) with at least one connection opening (310) with dimensions allowing passage of the retaining rods (308), reaching towards the casing (301) from the surfaces of the top clamp (302), the bottom clamp (306) and the middle clamp (307) facing the casing (301) and securing a distance between them;

At least one hollow fibre (311) passing through the apertures (303) on the top clamp (302), the bottom clamp (306) and the middle clamp (307) and lying between the top clamp (302) and the bottom clamp (306), coated with a catalytic metal in order to initiate the hydrogen generating reaction of the chemical hydride solution entering the casing (301) through the channels inside it;

At least one output port (313) located on the top lid (304) to allow the processed liquid mixture and hydrogen gas accumulated in the section between the hollow fibres (311) and the casing (301) to exit the casing (301).

In the preferred embodiment of the invention hollow fibres (311) are coated with a catalytic metal in order to help the reaction take place on a larger surface area.

In the preferred embodiment of the invention the top clamp (302) is in the form of a hexagon containing 7 apertures (303), one located at the centre of the hexagon and the remaining six located on each corner of the hexagon, through which the hollow fibres (311) pass.

In the preferred embodiment of the invention the retaining rod (308) is in the form of a rod with a gradually widening cross-section reaching through the casing (301) with gradually larger connection openings (310) to be aligned at determined positions to allow secure placement of the top clamp (302), the bottom clamp (306) and the middle clamp (307) at their determined positions.

In the preferred embodiment of the invention a loopback unit collects the chemical hydride solution after generation of hydrogen gas and removal of the chemical hydride out of the casing (301) and pumps it back to the metal hydride tank to establish circulation and increase efficiency.

In another embodiment of the invention hollow fibres (311) are passed through pipes lying through the clamps (302, 306, 307) on the centreline of the apertures (303) on the clamps (302, 306, 307). The surfaces of these pipes are coated with the catalyser same as the hollow fibres (311) in order to increase the available amount of reaction surface. In addition, the pipes are built with a perforated structure to ensure uninterrupted contact between the catalyser coated surfaces and the liquid mixture inside the casing (301).

In the preferred embodiment of the invention the base plate (305) is in the form of a cone reaching up into the casing (301), allowing accumulation of the solid wastes generated in result of the reaction at the edges where the base plate (305) and the casing (301) meet.

The preferred embodiment of the invention contains at least one axle (315) positioned on the centreline, providing a rotation movement on its axis by the drive of a motor and at least one sweeper (314) comprised of at least one blade (316) cleaning the surface of base plate (305) by pushing the solid wastes accumulated on the base plate (305) from the centre to the edges by the rotation movement. The solid waste output (317) allowing removal of the solid wastes pushed to the edges of the base plate (305) by the sweeper (314) is located on the casing (301).

In the preferred embodiment of the invention the casing (301) can be formed in the shape of a cylinder, a sphere or a rectangular parallelepiped.

The preferred embodiment of the invention contains a concentration sensor in order to measure the concentration of the solution which generates hydrogen gas in result of its reaction.

In the preferred embodiment of the invention a control unit controls and regulates flow rate, loopback ratio and concentration of the solution.

The preferred embodiment of the invention contains a filtering unit to prevent any problems arising from the solid wastes generated during generation of hydrogen gas inside the solution.

In the preferred embodiment of the invention the chemical hydrides used as fuel for generation of hydrogen gas include: neutral borane compounds (e.g. deca borane), ammonium boranes ($NH_xBH_y$ and $NH_xRBH_y$, x=1, 2, 3, 4, y=1, 2, 3, 4, R: methyl, ethyl, propyl, butyl groups), borohydrinde salts ($M(BH_4)_n$), tri-borohydride salts ($M(B_3H_8)_n$), decahydro borate salts ($M_2(B_{10}H_{10})_n$), tri-decahydro borate salts ($M(B_{10}H_{13})_n$), dodecahydro dodecaborate salts ($M_2(B_{12}H_{12})_n$), octadecahydro icosaborate ($M_2(B_{20}H_{18})_n$) (M: the group containing alkali metals, alkali earth metals, aluminium cations, zinc cations, ammonium cations, n: cation charge); $M^I M^{III} H_{4-n} R_n$, $M^{II}(M^{III} H_{4-n} R_n)_2$, ($M^I$ alkali metal, $M^{II}$ alkali earth metal or zinc, $M^{III}$: an element in boron, aluminium and gallium group, R: the group containing alkoxy, aryloxy, acyloxy groups, n: 0, 1, 2, 3) compounds and the group containing binary and poly combinations of these. The preferred embodiment of the invention uses a chemical hydride selected from among the group including sodium borohydride, lithium borohydride, potassium borohydride, ammonium borane and combinations of these.

The preferred embodiment of the invention uses a solvent suitable for the utilised chemical hydride, selected from among the group including water, protic solvents, alcohols, organic solvents and combinations of these. Citric acid, hydrochloric acid and sulphuric acid are preferred as protic solvents. Methyl alcohol, ethyl alcohol, propyl alcohol and isopropyl alcohol are preferred as alcoholic solvents.

In the preferred embodiment of the invention a catalyser selected from among the group including the metals from Group I B to VIII B on the periodic table as well as combinations, compounds and alloys of these. A catalyser selected from among the group containing platinum, ruthenium, nickel, cobalt, iron, rhodium and palladium metals and binary and poly alloys of these metals is preferred as the catalyser.

The inventive cartridge structure (300) designed for hydrogen generation is essentially comprised of one top lid (304), one top clamp (302), one bottom clamp (306), one middle clamp (307), hollow fibre (311), catalyser coating and a casing (301) containing these elements. The inventive cartridge structure (300) designed for hydrogen generation relates to a cartridge system used for generation of hydrogen from chemical hydrides (e.g. sodium borohydride, lithium borohydride, potassium borohydride, ammonium borane, etc.). In the inventive cartridge structure (300) designed for hydrogen generation, chemical hydrides dissolved in a solvent (e.g. water, alcohol, etc.) generate hydrogen by reacting on the surface of a catalytic metal (e.g. transitionary metals like platinum, ruthenium, nickel, cobalt, iron, rhodium and palladium, and binary or poly alloys of these, etc.). The catalyser coated surface can be a straight or porous surface comprised of the relevant metal or its alloys. The hydrogen gas generated in result of the reaction is transferred into a unit outside the cartridge and stored there. After hydrogen generation process the chemical hydride solution leaving the casing (301) is collected and refed into the system to establish circulation. A filtering unit capturing solid wastes at the bottom plate is utilised to prevent any problems arising from the solid wastes in the system. The processes of reaction, solution's exit from the system and its loopback into the system, and the collection and transfer of hydrogen gas are provided by the inventive cartridge structure (300) designed for hydrogen generation by itself.

The chemical hydride (e.g. sodium borohydride, lithium borohydride, potassium borohydride, ammonium borane, etc.) is fed in from a tank and starts to accumulate in the top clamp (302). Passing through the apertures (303) on the top clamp (302) into the casing (301) the solution contacts the hollow fibre (311) surface coated with the catalyser (e.g. transitionary metals like platinum, ruthenium, nickel, cobalt, iron, rhodium and palladium, and binary or poly alloys of these, etc.) and generates the reaction. The reaction started by the solution moving in contact with the hollow fibre (311) surface by effect of the catalyser results in generation of hydrogen gas. The hydrogen gas generated in result of the reaction moves upwards, accumulates in the casing (301) and leaves the system through an output port on the body. Meanwhile the solution with diminished (or completely expended) concentration finishes moving through the channels and accumulates on the bottom of the outer casing. When accumulation exceeds a certain level a collector pump starts and returns the accumulated solution in the tank.

Irregularity of the flow in the system can damage stability of the channels (312) in the hollow fibres (311). The clamps (302, 306, 307) used in the inventive cartridge structure both protect the stability of channels (312) and act as a level indicator for accumulated liquid. In addition, concentration of the system waste solution is determined by means of a concentration sensor and the solution is sent back to solution tank in order to render is reusable. This largely allows the system to run continuously, or in other words for a long time without intervention.

For optimum operating conditions, the inventive cartridge structure (300) designed for hydrogen generation can accommodate a liquid volume between 100 to 200 ml, and the catalyser surface area where the reaction take place can reach to 92265 mm$^2$ in average. Total volume of the cartridge (300) is 0.499 L. The hydrogen gas flow rate obtained by this optimum system is 922 ml/min in average. These values can be adjusted by changes in the system components and in the amount of materials utilised in the system.

Example 1

Surface area of 1 hollow fibre (HF)=450*12+ 1885*7=18600 mm$^2$ (internal and external)
Total catalyser surface area in the system (7 HF)=18600*7=130000 mm$^2$
$H_2$ gas flow rate obtained on a surface area of 4510 mm$^2$=260 ml/min
Total $H_2$ gas flow rate obtained from the catalyser surface in the system=7.37 L/min
System volme=75 mm*75 mm*$\pi$*113 mm=0.5 L
(75 mm=radius of cylindrical system, 113 mm-=height of system)

Assuming;
Hollow fibres (311) are smooth; and
Only the system volume is accounted, and tank volumes are not accounted in the calculation;
$H_2$ gas flow rate obtained in a system with a volume of 1 L=(7.37 L/min)*1 L/0.5 L=14.74 L/min. (where system volume is 1 L)

Surface area of one of the utilised hollow fibres (311) is 186 cm$^2$. The system contains 7 pieces of hollow fibres (311). Total surface area is 1302 cm$^2$. When the hollow fibres (311) in the system are coated with:
1. FeCl2 catalyser, the total hydrogen gas amount generated by the system is 260 NmL/min. This figure equates to 0.2 NmL/(min×cm2 hollow fibre surface area).
2. Pt/C catalyser, the total hydrogen gas amount generated by the system is 2604 NmL/min. This figure equates to 2 NmL/(min×cm2 hollow fibre surface area).
3. Pt—Ru catalyser, the total hydrogen gas amount generated by the system is 3906 NmL/min. This figure equates to 3 NmL/(min×cm2 hollow fibre surface area).
4. Porous platinum catalyser, the total hydrogen gas amount generated by the system is 7552 NmL/min. This figure equates to 5.8 NmL/(min×cm2 hollow fibre surface area).
5. Porous ruthenium catalyser, the total hydrogen gas amount generated by the system is 6901 NmL/min. This figure equates to 5.3 NmL/(min×cm2 hollow fibre surface area).

The inventive cartridge structure (300) designed for hydrogen generation utilises force of gravity to transfer the solution and utilises the inherent rise of hydrogen gas due to being lighter than air for directing the generated hydrogen gas. Thus the system does not have any energy requirement (excluding external units like the pump, the control unit, etc.).

In case the solution is not completely expended during its passage through the hollow fibre (311) channels (312), the accumulated liquid mixture has to be recovered and transferred to the tank. This requires a transfer unit (pump, etc.). In addition, a concentration measurement device is used to determine the concentration level of the solution where the concentration is diminished but not completely expended, in order to increase the concentration (by addition of reactant liquid or solid-powder chemical hydride) as necessary. Furthermore, the operation principle of the solution tank is also based on the force of gravity, thus minimising energy consumption of the system. Moreover, the tank geometry can also be adjusted as necessary and additional units can be added to adjust the amount of solution input into the system by unit of time, thus allowing adjustment of consumption level according to decision of the user.

The solution passing through the reaction channels (312) holding hollow fibres together accumulates between the casing (301) and the hollow fibres (311), and the liquid exceeding the volume that can be held in this space is removed through the port located on the top lid (304). Hydrogen accumulation begins immediately after beginning of the reaction, and continues until concentration of the solution decreases to a level which cannot generate hydrogen gas anymore. The hydrogen gas and liquid waste outputs of the system are collected separately.

A secure hold on retaining rods (308) of the casing (301) is ensured by means of the connection openings (310) on the top lid (304). In addition two separate output ports on the side surface of this element allow separate collection of hydrogen gas and liquid waste. A pump can be installed at the liquid waste output port in order to remove the liquid waste away from the system.

The retaining rods (308) in the casing (301) provides alignment anchors for the clamps (302, 306, 307) and the top lid (304). This allows the system to work as a symmetrical whole. In addition, the casing (301) allows temporary storage of the liquid waste exiting the channels (311) before it is removed from the system.

The middle clamp (307) secures the channels (311) passed through the apertures (303) on it, while the foils (309) on its sides anchor on the retaining rods (308) of the casing (301) through the connection openings (310) on them. Thus, any turbulent flow in the channels (311) is prevented from affecting the system or constricting or expanding the apertures (303) of the channels. Similarly, the top clamp (302) secures the channels (311) passed through the apertures (303) on it, while the connection openings (310) on its sides both anchor on the retaining rods (308) of the casing (301) and provide a groove for seating of the top lid (304). In addition, the solution tank is essentially attached to this piece. In other words, top clamp (302) serves as a connection element attaching three pieces to each other in the system. Thus, it ensures transfer of solutions from the solution tank into the channels.

The inventive cartridge structure (300) designed for hydrogen generation utilises a solid catalyser which is comprised of various metals or alloys of such metals. The system uses low amounts of solid catalyser. Despite this fact, the system provides a high amount of surface area. The catalyser is secured in the system by means of hollow fibres. The catalyser coated surfaces provide a largely homogenous reaction area for the liquid solution. The catalyser is not expended as time passes and solid waste accumulates at the bottom of the system, where it is periodically removed from the system.

The inventive cartridge structure (300) designed for hydrogen generation, clamps (302, 306, 307) are used to secure the formation and the positions of the hollow fibre structures. The clamps (302, 306, 307) protect the system and channel structure from getting disrupted, thus ensuring a stable flow. The fact that fibres are located in a channel (311) coated with the catalyser and the fact that the channel (311) is filled with the liquid together ensure that there is no performance drop in the system. The liquid solution flows through the channels (311). Since the system elements are modular they can be reused many times. Replaceable and easy to repair nature of hollow fibres and other elements make the system a modular one. The system inputs and outputs are at a single area, which is seen to provide a more successful and durable model in comparison to the conventional applications. Since the hollow fibres do not have to carry gas all their surfaces can be coated with the catalyser, which provides a significantly large surface area in a very small volume. The hydrogen dissociates from the liquid and leaves the system on its own. Hydrogen is directly collected at the system output port. The system contains a sweeper (314) to collect the solid waste generated at the bottom of the system in result of the reaction, thus preventing any potential blockage.

Various metals are used as catalyser with the hollow fibres. Hollow fibres are not made of these metals, but only coated with the metal. Due to the material used to make them the hollow fibres are both produced with a low cost and physically occupy less volume and have less mass. Hydrogen gas is generated in result of the reaction between the chemical hydrides and the liquid reactant by effect of the catalyser. Gas dissociates from the liquid and leaves the system. The chemical reaction automatically takes place in the system. The system is designed to provide a standalone modular cartridge structure for generation of hydrogen. The simple and easy to use design of the system provides lower production and maintenance costs as well as a long useful life.

The fact that the utilised catalysers do not undergo any physical or chemical loss as time passes provide continuity of operation and prevent any additional cost. The utilised catalysers do not cause any risk for human health or environment. The continuous flow provided in the system protects the concentration and internal flux. The upright position of the system and use of the clamps (302, 306, 307) protect rigidity of the hollow fibres and ensure uninterrupted flow. In addition the upright position ensures that the sediment accumulates on the baseplate (305) of the cartridge structure (300) rather than accumulating on the hollow fibres (311), thus preventing blockage in the system. A filter mechanism (hourglass model) is located at the bottom of the system to prevent the solid sediment from blocking the channels. Later, this filter can be cleaned during regular maintenance. The inventive cartridge structure (300) designed for hydrogen generation has a modular structure, enabling easy disassembly into its sub-components, thus providing low maintenance and repair costs.

The utilised solution does not require any preliminary process before being added to the system. Use of polymer based hollow fibres (311) decreases design and production costs. The inventive cartridge structure (300) designed for hydrogen generation provides a large surface area in a small volume, and thus increases reaction efficiency. In case the tank feeding the system contains an oversaturated solution the solution will be sent back to the tank after being processed in the system, thus ensuring that the solution is utilised with the highest possible efficiency.

The ability to easily produce hollow fibres and the design flexibility provided by that fact allow design of the casing (311) in the form of a cylinder, a sphere (tree model) or a rectangular parallelepiped. The fact that hollow fibres have both channels allowing passage of the liquid and a large amount of porous surface area eliminates the need for additional flow channels and surface area providing pieces.

In cases where width can prove a problem the system can be adjusted by decreasing the overall width or by decreasing the number of hollow fibres. In this case the length of the system and the hollow fibres can be increased to maintain the total reaction surface area at the same level, thus preventing any loss in system performance. The number and calibre of the pores on the hollow fibres can also be changed. Thus the performance can be adjusted by means of diversification of hollow fibre structure without making any other change in the system structure. In addition, the surface area can also be adjusted by changing the porosity of the hollow fibres.

The invention claimed is:

1. A cartridge structure for a hydrogen generating reaction from metal hydride comprising:
    at least one outer casing in the form of a closed container comprising a top plate, a bottom plate, and a plurality of apertures on its surface;
    at least one liquid reactant input port connected with a liquid reactant tank configured to feed solvent into the outer casing;
    at least one metal hydride tank containing the metal hydride, having a base plate in the form of a reversed truncated cone which aligns with an aperture on the top plate of the outer casing, and having a one way lid on this truncated surface;

at least one shaft passing through a centreline of the outer casing and lying between the top and bottom plates, on which propellers emplaced at varying levels with blades at various orientations are mounted with intervals, rotating on its own axis by means of a motor;

at least one extension placed on at least one blade of the propeller closest to the top plate of the outer casing, which is positioned to align with the aperture during rotation of the blade, comprising an empty cylinder containing a spring and at least one spherical end attached to the spring pushed towards the top plate by force applied by the spring, wherein the pushing force is transferred to the top plate through the spherical end, which allows metal hydride into the outer casing through the aperture by pushing the one way lid;

at least one hollow fibre coated with a catalytic metal configured to promote the hydrogen generating reaction in a chemical hydride solution composed of the metal hydride and the solvent blended by impact of the propellers and reacted during their passage through the outer casing;

at least one clamp securing the hollow fibres in their determined position, lying lengthwise inside the outer casing, passing through the apertures on the outer casing;

retaining rods reaching into the outer casing to retain the clamp on its specified position on the outer casing; and foils with at least one connection opening with dimensions allowing passage of the retaining rods, reaching towards the outer casing from the surface of the clamp facing the outer casing and securing a distance between them.

2. The cartridge structure according to claim 1, wherein the cartridge structure is made of hard polymeric materials like Castermid, Teflon, Plexiglas, Delrin, borosilicate, nylon, polyurethane, polyvinyl chloride (PVC), low density polyethylene (LDPE), linear low density polyethylene (LLDPE), high density polyethylene (HDPE), ethylene vinyl acetate (EVA), natural rubber, synthetic rubber, polystyrene, polymethylmethacrylate (PMMA), polyolefins, polycarbonate, polyoximethylene and the group including combinations of these materials, in order to obtain a strong yet also lightweight structure.

3. The cartridge structure according to claim 1, wherein the multiple shafts are supported by bearings on the joining points and having differing numbers of gears at the section where propellers are mounted, in order to have the propellers rotate in differing directions and speeds, thus ensuring an efficient mixture.

4. The cartridge structure according to claim 1, wherein an axle is connected to the shaft through a bearing in order to prevent any disruption in the axis of the shaft.

5. The cartridge structure according to claim 1, wherein at least one filter is located on the bottom lid inside the outer casing for capturing the solid waste materials, generated in result of the reaction, between the at least one filter and the bottom lid and preventing the solid waste materials from rising again.

6. The cartridge structure according to claim 1, wherein at least one H2 collector output is located on the top plate of the outer casing for collecting the hydrogen gas generated by the reaction and rising to the top.

7. The cartridge structure according to claim 1, wherein a clamp in the form of a hexagon contains 7 apertures, one located at the center of the hexagon and the remaining six located on each corner of the hexagon, through which the hollow fibers pass.

8. The cartridge structure according to claim 1, wherein a retaining rod in the form of a rod with a gradually widening cross-section reaches through the outer casing to allow emplacement of clamps with gradually larger connection openings to be aligned at determined positions.

9. The cartridge structure according to claim 1, wherein hollow fibers fibres are coated with the catalytic metal on their outside surface in addition to the channels in order to provide a larger contact surface for the reaction.

10. The cartridge structure according to claim 1, wherein at least one chemical hydride used as fuel for generation of hydrogen gas, is selected from among a group including neutral borane compounds (e.g. deca borane), ammonium boranes (NHxBHy and NHxRBHy, x=1, 2, 3, 4, y=1, 2, 3, 4, R: methyl, ethyl, propyl, butyl groups), borohydride salts ($M(BH_4)_n$), tri-borohydride salts ($M(B_3H_8)_n$), decahydro borate salts ($M_2(B_{10}H_{10})_n$), tri-decahydro borate salts ($M_2(B_{20}H_{18})_n$), dodecahydro dodecaborate salts ($M_2(B_{12}H_{12})_n$), octadecahydro icosaborate ($M_2(B_{20}H_{18})_n$) (M: the group containing alkali metals, alkali earth metals, aluminium cations, zinc cations, ammonium cations, n: cation charge); $M^I M^{III} H_{4-n} R_n$, $M^{II}(M^{III} H_{4-n} R_n)_2$, ($M^I$ alkali metal, $M^{II}$ alkali earth metal or zinc, $M^{III}$: an element in boron, aluminium and gallium group, R: the group containing alkoxy, aryloxy, acyloxy groups, n: 0, 1, 2, 3) compounds and the group containing binary and poly combinations of these.

11. The cartridge structure according to claim 10 wherein at least one solvent suitable for the utilized chemical hydride, is selected from among the group including water, protic solvents, alcohols, organic solvents and combinations of these.

12. The cartridge structure according to claim 1, wherein at least one catalyser is selected from the group consisting of the metals from Group I B to VIII B on the periodic table, combinations, compounds and alloys thereof.

13. The cartridge structure according to claim 1, wherein the hollow fibers are contained in or on pipes and pass though apertures on the clamps on the centerline.

14. The cartridge structure according to claim 13, wherein the pipes are coated with the catalyser as the hollow fibers in order to increase the reaction surface.

15. The cartridge structure according to claim 1, wherein a loopback unit is configured to collect the chemical hydride solution after generation of hydrogen gas and remove the chemical hydride out of the outer casing and pump the chemical hydride back to the metal hydride tank to establish circulation and increase efficiency.

16. The cartridge structure according to claim 1, wherein a concentration sensor is used to measure the concentration of the solution which generates hydrogen gas in result of its reaction.

17. The cartridge structure according to claim 1, wherein a control unit controlling and regulating flow rate, loopback ratio and concentration of the solution is used.

18. The cartridge structure according to claim 17, further comprises a control unit which determines the metal hydride concentration in the mixture inside the outer casing according to the data obtained from a concentration sensor inside the outer casing and regulating metal hydride and liquid reactant feeding rates according to this information.

19. The cartridge structure according to claim 1, further comprises a filtering unit to prevent any problems arising from the solid wastes generated during generation of hydrogen gas inside the solution.

* * * * *